United States Patent Office 2,849,889
Patented Sept. 2, 1958

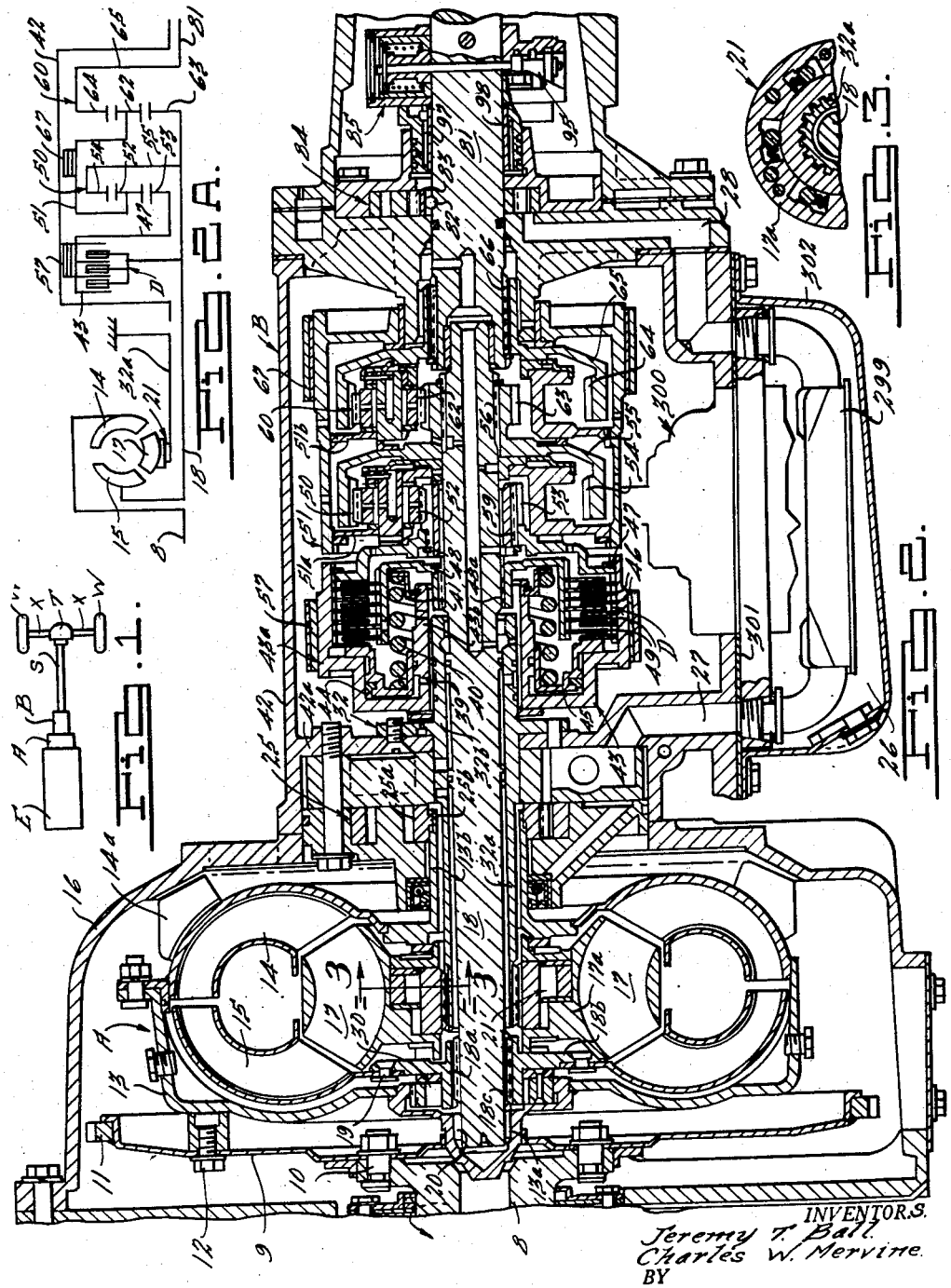

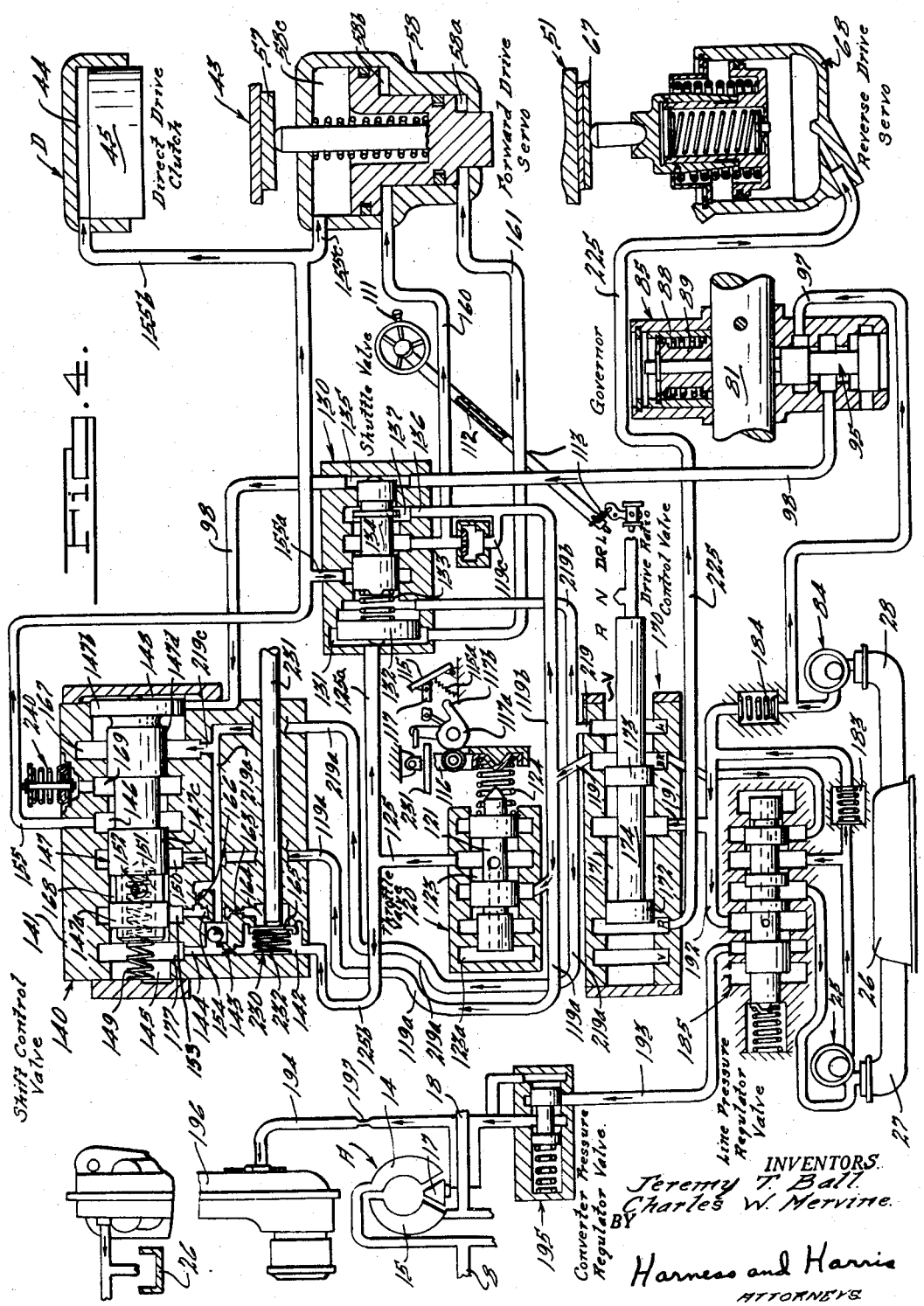

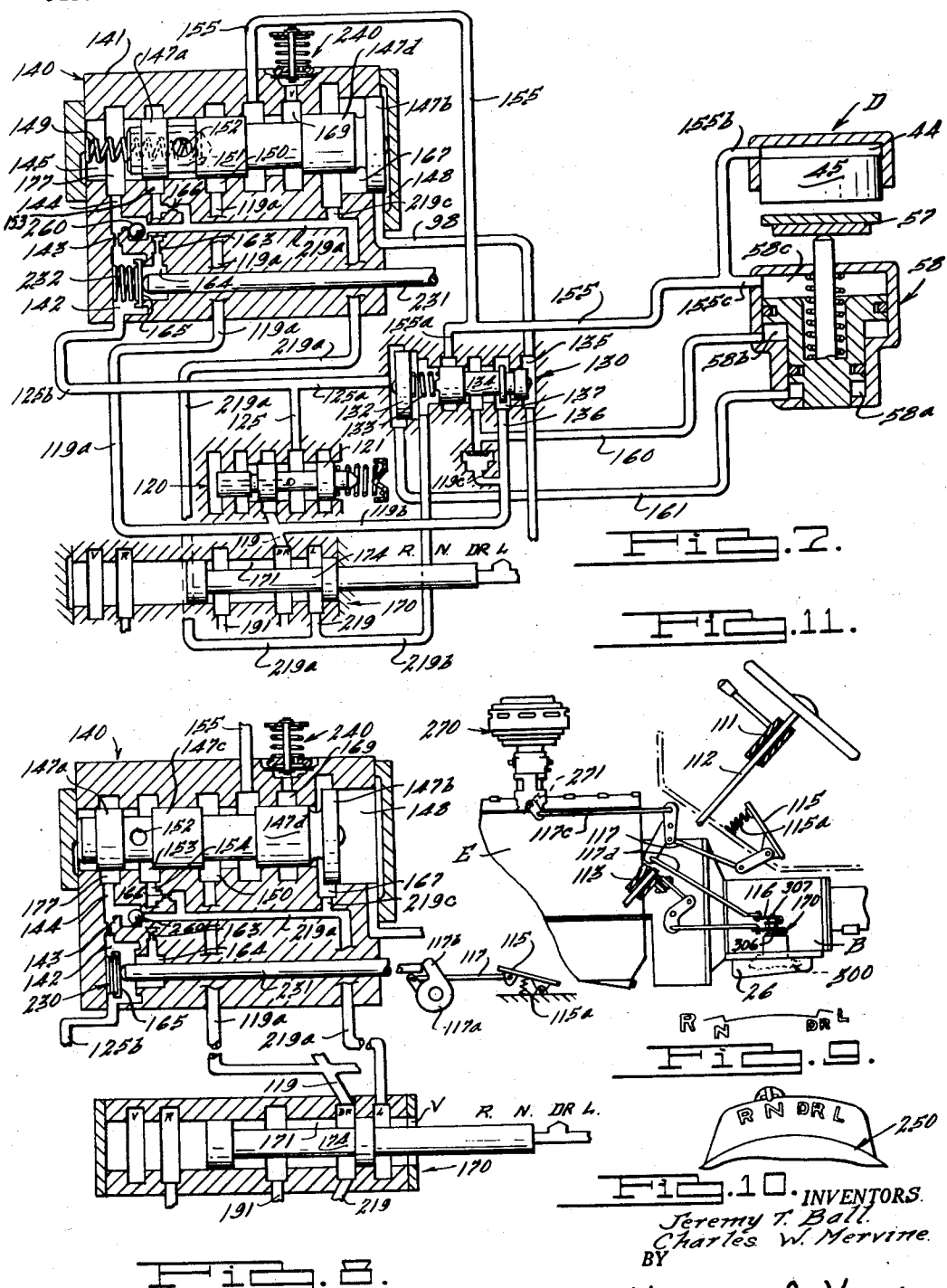

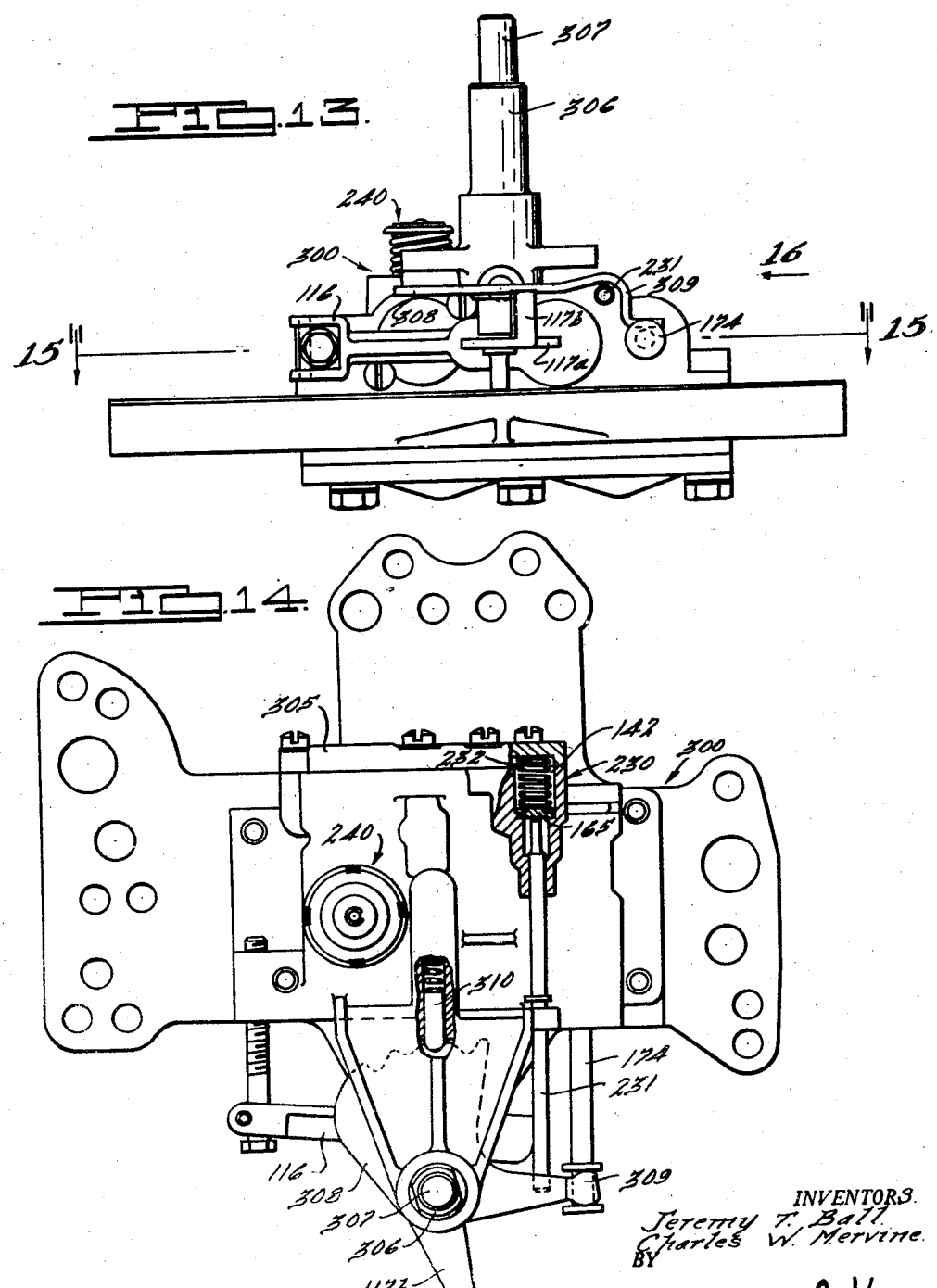

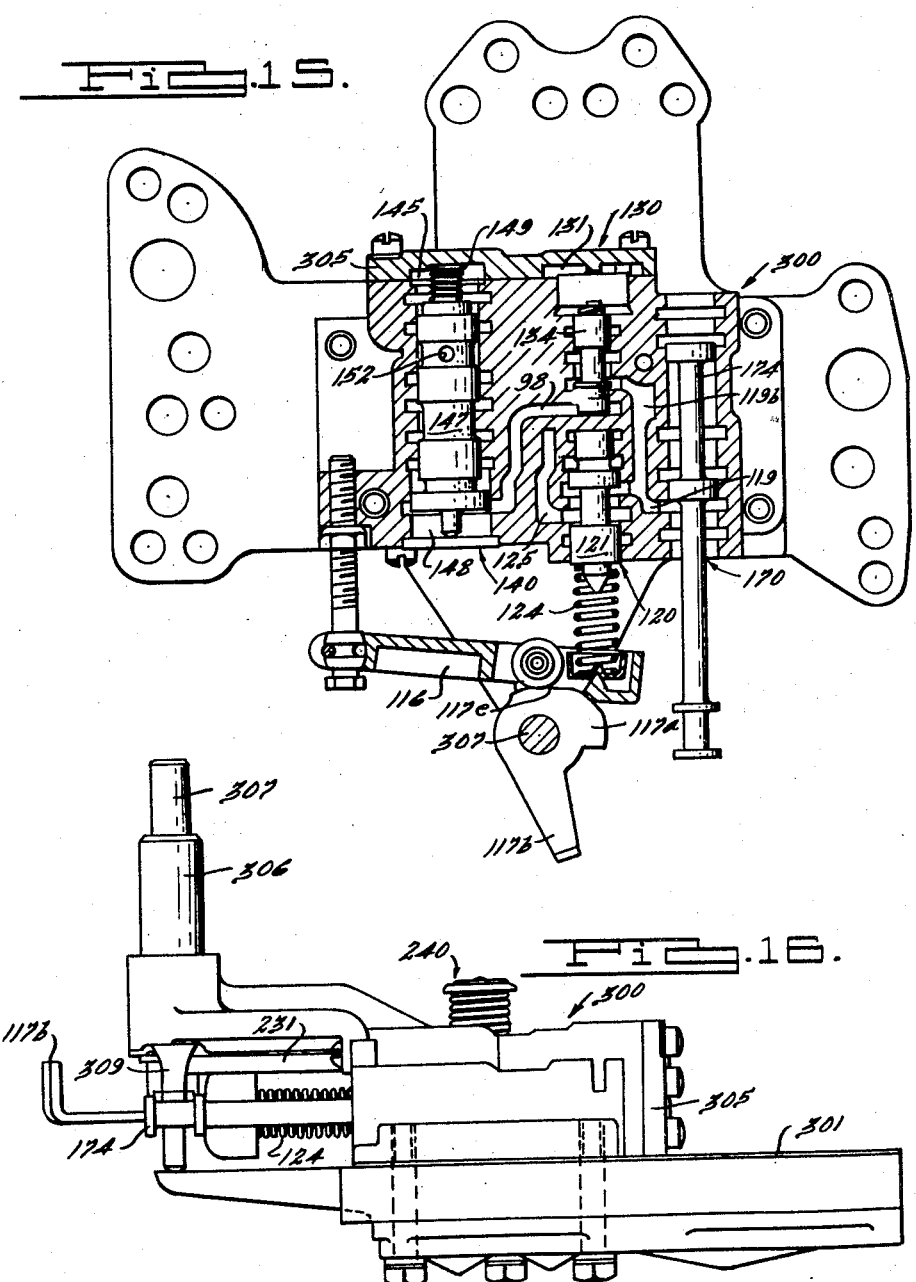

2,849,889

TRANSMISSION AND CONTROLS THEREFOR

Jeremy T. Ball, Birmingham, and Charles W. Mervine, Royal Oak, Mich., assignors to Chrysler Corporation, Highland Park, Mich., a corporation of Delaware Application January 25, 1952, Serial No. 268,274

38 Claims. (Cl. 74—472)

This invention relates to power transmission units primarily adapted for motor vehicle drive and particularly to the hydraulically operated control system that automatically operates the speed ratio change mechanism associated with a power transmission unit of this general type.

It is a primary object of this invention to provide control valving such that smooth, fast, upshifts and downshifts in speed ratio drive are assured under all driving conditions.

It is another object of this invention to provide speed ratio change control valving of an improved and simplified form that is economical to manufacture and operate and designed such that it is self wiping during operation so as to substantially eliminate the possibility of valve sticking during operation thereof.

It is a further object of this invention to provide a reciprocable control valve with an improved form of snap action shift that prevents valve hunting.

It is still another object of this invention to provide for automatic snap action shift of a control valve as a result of step-by-step variation in the valve actuating pressure heads due to controlled bleeding of pressurized actuating fluids through series arranged restriction orifices.

It is still another object of this invention to provide a reciprocable control valve wherein a throttle responsive pressure fluid created force and a spring generated force are applied to the valve to effect shift thereof in one direction and a vehicle speed responsive pressure fluid created force is applied to the valve to effect shift thereof in the opposite direction, said throttle responsive pressure fluid being prevented from acting on the valve in certain positions thereof.

Other objects and advantages of this invention will become readily apparent from a consideration of the subsequent description and the related drawings wherein:

Fig. 1 is a schematic view of a motor vehicle drive train that includes a power transmission unit embodying this invention;

Fig. 2 is a sectional elevational view of the power transmission unit utilized in the disclosed drive train of Fig. 1;

Fig. 2A is a schematic line diagram of the power transmission unit shown in Fig. 2;

Fig. 3 is an enlarged, fragmentary sectional, elevational view of the one-way brake mechanism associated with the guide wheel of the drive train torque converter device, the view being taken on the line 3—3 of Fig. 2;

Fig. 4 is a diagrammatic view of the hydraulically operated control system for this power transmission unit when the control valving thereof is set for neutral and the throttle valve is closed or in engine idle position;

Fig. 5 is a fragmentary diagrammatic sketch partly in section of portions of the control valving shown in Fig. 4 when the valving has been set for the initiation of forward drive through the drive ratio and the throttle valve has been opened sufficiently to accelerate the vehicle to a speed such that the automatic controls are in the process of shifting the control valving from the breakaway underdrive ratio to the cruising direct drive ratio;

Fig. 6 is a fragmentary diagrammatic sketch partly in section of the control valving shown in Fig. 5 when the valving has been automatically upshifted to the positions for producing the forward direct drive ratio;

Fig. 7 is a fragmentary diagrammatic view of portions of the control valving shown in Fig. 4 when the drive ratio selector lever has been placed in the low forward drive position to lock the transmission in the forward underdrive ratio for coast drive braking purposes, the throttle valve being closed at this time and the vehicle speed being in the lower speed range although the conditions remain the same at high speeds;

Fig. 8 is a fragmentary diagrammatic view, partly in section, of portions of the control valving shown in Fig. 4 after the engine accelerator pedal has been sufficiently depressed to cause a kickdown to the forward underdrive ratio from the direct drive ratio;

Fig. 9 is a diagrammatic view in side elevation of the shift positions of the drive ratio selector lever;

Fig. 10 is a plan view of the drive ratio selector lever shift quadrant;

Fig. 11 is a side elevational view of a motor vehicle power plant employing this power transmission unit and the control mechanisms herein disclosed;

Fig. 12 is a diagrammatic view of a portion of the "throttle" pressure flow conduit through the shift control valve that contains the series arranged flow restriction orifices;

Fig. 13 is an end elevation of the valve body that contains the several transmission control valves;

Fig. 14 is a top plan view, partly in section of the control valve body shown in Fig. 13;

Fig. 15 is a sectional elevational view of the valve body shown in Figs. 13 and 14, the view being taken along the line 15—15 of Fig. 13; and Fig. 16 is a side elevational view of the valve body shown in Figs. 13–15, the view being taken in the direction of the arrow 16 of Fig. 13.

Fig. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear wheels W of the vehicle.

Fig. 2 of the drawings discloses the power transmission unit structure that consists of the hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the somewhat axially flexible drive transmitting plate 9 by the bolt means 10. The drive transmitting plate 9 has an engine starter ring gear 11 fixedly mounted thereon and seated in a step-like formation extending about the periphery of plate 9. Drivingly connected to the drive plate 9, by the bolt means 12, is the torque converter casing 13. Within casing 13 are mounted several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. Air circulating vanes 14a may be mounted on the exterior of impeller 14 to assist in cooling the converter fluid. Suitable air inlet and outlet ports (not shown) are provided in the housing 16 to permit passage of cooling air about the converter casing 13 on rotation of the vanes 14a. The vaned turbine wheel 15 is drivingly connected by rivet means 19 to a radially extending flange portion 18b formed on a shaft hub member 18a. Shaft hub member 18a is drivingly connected by splines 18c to the forward end portion of the intermediate driven shaft member 18. A one-way clutch 30 may be connected between the hub member 18a and the converter casing 13 to prevent shaft 18 overrunning casing 13 in a forward drive direction. Clutch 30 facilitates pushed or towed starts.

The intermediate shaft member 18 is adapted to transmit drive from the turbine member 15 of the torque converter device A to the planetary gearing of the gear box unit B that is arranged rearwardly of and in series with the torque converter device A. The forward end of intermediate shaft 18 is journalled in a bearing 20 that is piloted in an axially extending seat 13a formed in the hub of the torque converter casing 13. The intermediate portion of intermediate shaft 18 is rotatably supported by a sleeve plate 32 carried by the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the axially extending sleeve portion 32a of the sleeve plate 32. Sleeve plate 32 is fixed to and projects from the wall 42a of the relatively stationary gear box housing 42. The one-way brake 21 (see Fig. 3) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in Fig. 3.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through supply conduit 27 and circulates this oil through the converter A, the transmission unit lubricating system and the various subsequently described, hydraulically operated control mechanisms associated with this power transmission unit (see Fig. 4). A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine drive pump 25 might not be operating. Pump 84 will thus provide pressurized fluid during pushed or towed starting as well as during engine driven operation of the vehicle.

The gear box B includes the direct drive clutch D and the pair of planetary gear trains 50 and 60 that are adapted to cooperate with the torque converter device A to provide means for the transmission of forward and reverse drives to the propeller shaft S, Fig. 1.

The sleeve plate 32, that is detachably mounted on the forward wall 42a of the gear box housing 42, includes a rearwardly directed, axially extending, sleeve-like flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate flange portion 32b, is positioned to extend between the piston 45 and an anchor ring 41 that is fixed to the portion 43b of the drum 43. Spring 40 continuously urges the piston 45 forwardly to a clutch disengaged position.

On admission of pressure fluid to piston bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 40 to its clutch disengaged position.

The forwardly positioned planetary gear train 50 that is adapted to be activated to provide means for transmitting a forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is rotatable about the intermediate shaft 18 and is arranged in meshing engagement with the planet pinions 52. Sun gear element 53 is carried by and drivingly connected at 59 to the backing plate member 47 of the direct drive clutch D. Accordingly, drive may be transmitted from shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the direct drive clutch D, is adapted to be applied to drum element 43a of clutch D to anchor the sun gear 53 of planetary 50 against rotation. Band 57 is applied to drum 43 by means of the servo mechanism 58 (see Fig. 4). Application of band 57 to drum 43 activates planetary gear train 50 for the transmission of a forward underdrive ratio from input shaft 18 to output shaft 81 by means subsequently described. The transmission of the forward underdrive ratio is through planetary gear trains 50 and 60 which function in a compounded relationship for the transmission of forward drive. The means utilized for the transmission of this forward underdrive ratio will become more apparent after reading the description of reverse drive planetary gear train 60.

Rearwardly positioned, reverse drive planetary gear train 60 includes the planet pinion carrier plate 51b that is connected to and supported by the drum-like planet pinion carrier element 51. Rotatably mounted on carrier plate 51b are a plurality (only one shown) of planet pinion gears 62. Planet pinion gears 62 are arranged in meshing engagement with the sun gear element 63. Sun gear 63 is drivingly connected to the intermediate shaft 18 through spline 56. In the construction disclosed, it will be noted that the sun gear 63 of the rear planetary gear train 60 is integral with the annulus gear 54 of the forwardly positioned forward drive planetary gear train 50. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the drum-like carrier member 51, is arranged to be engaged with carrier 51 to anchor the carrier 51 against rotation. Band 67 is applied to carrier 51 by means of the servo mechanism 68, (see Fig. 4). Application of band 67 to the planet pinion carrier 51, while direct drive clutch D is disengaged, will activate rear planetary gear train 60 for the transmission of a reverse drive from intermediate shaft 18 through sun and planet gears 63, 62 respectively to the annulus gear 64 which latter gear is drivingly connected to the output shaft. This specific gear box is not a part of the invention herein claimed but is covered by the application of Augustin J. Syrovy et al., Serial No. 238,646 filed July 26, 1951, now U. S. Patent 2,748,622.

With the power transmission unit herein disclosed it is possible to initiate forward drive through a high torque multiplication forward underdrive ratio that is automatically convertible into a fluid cushioned, forward direct drive at the most advantageous point depending on the driving conditions encountered. The final fluid cushioned direct drive ratio, being transmitted through the fluid of the torque converter A, is particularly suited for smooth downshifts to and upshifts from the torque multiplying underdrive ratio. This fluid drive transmitting arrangement reduces the possibility of engine stall at very low vehicle speeds while the transmission is set in the cruising direct drive ratio.

Whenever forward drive is to be initiated through the transmission, direct drive clutch D is initially disengaged and braking band 57 is applied to the clutch drum portion 43a to anchor the sun gear 53 of forward drive planetary gear train 50 against rotation. With sun gear 53 anchored against rotation the gear train 50 is activated and torque converter driven input shaft 18 causes the forward drive train annulus 54 to drive the pinion gears 52 and the pinion gear carrier 51 forwardly or clockwise. As a result of the pinion gear carrier 51 rotating clockwise the several planet pinions 62 of the reverse drive gear train 60 are carried forwardly and at the same time shaft 18 is driving the sun gear 63 of the reverse drive gear train 60 forwardly so that a compounded resultant forward drive is transmitted to the annulus gear 64 that is drivingly connected to the output shaft 81. Acceleration through the starting combination fluid and mechanically generated, torque multiplying, forward drive train continues until certain output shaft speed and torque conditions are achieved and then the transmission control system, subsequently described, automatically causes the brake band 57 to be disengaged from the drum flange 43a and the planetary direct drive clutch D to be engaged to then convert the torque multiplying forward underdrive into a direct drive. Release of band 57 and engagement of clutch D provides for the transmission of a substantially 1:1 ratio forward direct drive from input shaft 8 through converter A to the intermediate driven shaft 18 which latter shaft is directly connected to the output shaft 81 by the engaged direct drive clutch D. Engagement of clutch D on release of brake band 57 locks up two gears of the planetary gear train 50 so that gear train 50 transmits drive from shaft 18 to gear train 60 at a 1 to 1 ratio through the planet pinion gear carrier 51. As sun gear 63 of gear train 60 is also rotating at the speed of shaft 18 it is obvious that gear train 60 is also locked up for the transmission of forward drive at a 1 to 1 ratio. With the forward drive ratio hereinabove described, it is possible to get exceptional accelerating power due to the fact that the starting drive torque multiplication ratio of about 2.5 to 1 of the converter is combined with the torque multiplying ratio of approximately 1.7 of the forward driving compounded planetary gear trains 50, 60 and these ratios combine with an axle ratio of between 3.3 to 3.9 to 1 to give an overall starting ratio of between 13.4 and 15.8 to 1. It is thought to be quite obvious that such a transmission will give rocket-like acceleration when associated with some of the current high power motor vehicle engines.

Reverse drive may be obtained by applying brake band 67 to the carrier member 51 of the reverse planetary gear train 60, the clutch D and band 57 being disengaged at this time. Drive from input shaft 8 is then transmitted through the torque converter A to turbine driven intermediate shaft 18. Shaft 18 drives the sun gear 63 of the reverse drive planetary train 60 forwardly while pinion gear carrier 51 is being held by brake band 67. Accordingly, a combination fluid and mechanically transmitted torque multiplying reverse drive is transmitted to the annulus gear 64 of gear train 60. As annulus 64 is directly connected to the output shaft 81, a combination fluid and mechanically generated, torque multiplying reverse drive is transmittable from the input shaft 8 through the converter A and gear train 60 to the output shaft 81 when band 67 is applied to carrier 51 and clutch D and band 57 are released.

Drivingly connected to the output shaft 81 (see Fig. 2) by the pin 82 is a driving gear 83 of the rear oil pump 84. Oil pump 84 is arranged to draw fluid from the oil sump 26 through conduit 28 and to circulate the discharged pressurized fluid through the torque converter A and the hydraulically operated control and lubrication systems of the transmission unit. As aforementioned, pump 84 is operative whenever the output shaft 81 is rotating above a predetermined speed. Suitable valving, such as the line pressure regulator valve unit 185 shown in Fig. 4, is provided to insure that pump 84 automatically takes over the supply of pressure fluid for the transmission unit and its control system whenever the speed of output shaft 81 exceeds a certain predetermined relatively low value. This pressure regulator valving 185 is described in the co-pending application of William L. Sheppard, Serial No. 98,493, filed June 11, 1949, now U. S. Patent 2,697,363.

Also drivingly mounted on the output shaft 81 (see Figs. 2 and 4) is a speed responsive, centrifugal force operated, governor mechanism 85 which provides one of the means for automatically controlling operation of this power transmission unit. It is obvious that various types of vehicle speed responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted telescopically arranged weights 88, 89 for controlling actuation of the radially movable governor control valve 95 so as to provide a novel type of pressure fluid operated, output shaft speed responsive governor mechanism. This governor mechanism 85 is completely described in the said co-pending application of William L. Sheppard, Serial No. 98,493, filed June 11, 1949, now U. S. Patent 2,697,363.

While the pressure of the fluid discharged from the pump 84 into the governor inlet passage 97 is almost constant and also greater than the pressure of the fluid discharged from the governor mechanism into the governor outlet passage 98, due to the reducing valve action of governor piston valve 95, still, it will be found that the pressure of the fluid discharged from the governor 85, hereafter denoted "governor" pressure, is roughly proportional to the speed of the output shaft 81. Governor 85 thus provides an efficient, accurate, simplified form of speed sensitive control mechanism.

The control system (see Fig. 4) for this transmission includes the manually operable drive ratio selector lever 111 which is rotatably mounted on the conventional motor vehicle steering shaft 112. Control lever 111 is connected by suitable linkage 113 to the manually operable drive ratio selector valve 170. Valve 170 has four drive ratio positions which are represented in the drawings by the letters R, N, DR and L respectively. These letters correspond to the reverse, neutral, drive and low ratios which ratios are selectively obtainable by manual shift of selector lever 111. The letter V associated with the valves 120, 140, 170, 185 and with the other valve units of this control system, denotes a vent or drain port for returning the control system pressure fluid to the supply sump 26.

Pressure fluid from either of the supply pumps 25 or 84 is directed into the main supply conduit 191 which is connected to the inlet port of manually operable drive ratio selector valve 170. The pressure of the fluid in supply conduit 191 is controlled by the pressure regulator valve 185 and this controlled, substantially constant intensity, pump supplied pressure is denoted "line" pressure (approx. 90 p. s. i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the neutral position (Fig. 4) the valve lands 172 and 173 of its plunger or spool-type valve element 174 close off the escape of pressurized "line" fluid from valve bore 171 and thus "line" pressure fluid cannot pass from supply conduit 191 through valve 170 to activate any of the drive ratio control mechanisms. However, it should be noted that when the manually controlled valve 170 is placed in the neutral position with the vehicle engine running, or when the vehicle is being pushed or towed so that one or the other of pumps 25 or 84 is operating, "line" pressure fluid from one or the other of pumps 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 has associated therewith a flow restriction 197 and a finned air or fluid circulating radiator-type converter fluid cooling unit 196. The converter pressure regulator valve 195 preferably maintains a pressure of approximately 40 to 50 p. s. i. in the converter at all times.

In either of the forward drive ratio positions DR, or L of the drive ratio selector valve element 174, "line" pressure fluid from supply conduit 191 will always be directed through the bore 171 of valve unit 170 and into the conduits 119, 119a that connect the manual drive ratio selector valve unit 170 with the torque controlled or torque responsive throttle valve unit 120. Consequently a form of torque responsive control is always available to cooperate with the driven shaft speed responsive governor 85 to conjointly control automatic operation of this transmission unit in all forward drive ratios. "Line" pressure passed to conduit 119 whenever the ratio selector valve 170 is in either drive or low ratio also fills conduit 119b and is passed into conduit 160 for transfer to the apply side chamber 58b of the servo 58 for forward drive train 50. Thus planetary 50 is activated for the forward underdrive whenever valve unit 170 is set for drive or low and all starts will be through the underdrive initially.

The torque responsive throttle valve unit 120 (see Fig. 4) has operably associated therewith a kickdown valve-controlled mechanism 230 that is hereinafter described. The torque responsive throttle valve 120 is operated by linkage 116, 117 connected to the throttle control or accelerator pedal 115 for the engine unit E that drives this power transmission unit. Pedal 115 is connected by linkage 117 to the rotatable cam 117a that is adapted to activate the pivotally mounted lever linkage 116. The piston type throttle valve element 121 of valve unit 120 is arranged to be reciprocated by oscillation of the linkage 116. Throttle valve unit plunger element 121 is arranged to reciprocate in the bore 123 of the valve unit 120 and it is connected to the actuating linkage 116 through a compression spring 124. At closed or idle throttle position of the accelerator pedal 115 with the manual control valve 170 set for either of the forward drive ratios, DR or L, the arrangement of the plunger valve 121 in bore 123 of valve 120 is such as to permit pressurized fluid to seep from the supply conduit 119a into and through valve 120 to the conduit 125 and then into branch conduits 125a and 125b. The pressure of the fluid passing out of valve 120 will be lower than that of the line pressure supplied thereto due to the reducing valve action of valve 120. This reduced or compensated line pressure supplied to conduits 125, 125a and 125b, is denoted "throttle" pressure hereafter.

The "throttle" pressure admitted to the branch conduit 125b from valve 120 is passed into a chamber 142 located in the lower left end of the body 141 of shift control valve 140. Chamber 142 of valve body 141 contains the kickdown valve mechanism 230 that is subsequently described. Chamber 142 of valve 140 is connected through a restriction orifice 143 to a conduit bore 144. Bore 144 opens into a chamber 145 located at the left end of the stepped, cylindrical valve bore 146 in valve body 141. Bore 146 reciprocably mounts the multiple land plunger valve 147. Valve 147 is of a T-shaped cross sectional configuration in which the land 147b forms the head portion and the connected lands 147a, 147c, 147d from the stem portion. It is thought to be obvious that the "throttle" pressure admitted to bore chamber 145 will apply a throttle responsive force to the valve land 147a at the left end of valve 147 which force will tend to shift the valve 147 towards the right end of valve bore 146.

In addition to the force of the "throttle" pressure acting on the valve land 147a there is a spring generated force constantly applied to the left end of valve 147 that also tends to shift the valve 147 towards the right end of valve bore 146. This spring generated force results from the mounting of the precompressed spring 149 in the left end of bore 146 so that it acts to urge valve 147 rightward at all times.

At the right end of the bore 146 for valve 147 is a chamber 148 that is connected by the conduit means 98 to the outlet from the hydraulic governor 85. Conduit 98 pressurizes the valve bore chamber 148 with a "governor" pressure fluid in which the pressure value is proportional to the speed of the transmission output shaft 81. It is thus thought to be apparent that a force will act upon the land 147b at the right end of valve 147 that is proportional to the speed of the vehicle and that this "governor" pressure generated force will tend to shift the valve 147 towards the left end of valve bore 146.

Thus it will be seen that the pressure differential between the "throttle" responsive pressure fluid and the spring 149 applied to one end of valve 147 and the "governor" pressure fluid applied to the other end of valve 147 effects reciprocating movement of the valve 147 within valve bore 146. At relatively low output shaft speeds and open throttle the force of the "throttle" pressure in chamber 145 plus the force of spring 149 is greater than the force of the "governor" pressure in chamber 148 and the valve 147 is automatically positioned substantially as shown in Fig. 5. As the output shaft speed increases a point is reached where the "governor" pressure in chamber 148 exerts a force on the right end of valve 147 that overcomes the force of the "throttle" pressure and spring 149 on the left end of valve 147 and then valve 147 shifts towards the left to a position such as that shown in Fig. 6. This differential pressure generated shift of the valve 147 is utilized to automatically control operation of the direct drive clutch D and the control servo 58 for the forward drive braking band 57 as will be clearly brought out hereafter. It should be pointed out at this time that the diameter of the right end valve land 147b is greater than the diameter of the left end valve land 147a; thus, the value of the "governor" pressure in chamber 148 need not actually exceed the value of the "throttle" pressure in chamber 145 in order to effect a leftward shift of the valve 147. It is the differential forces produced by the opposed "throttle" and "governor" pressures in combination with the force of spring 149 that dictate the shifts of valve 147. Furthermore, it is thought to be obvious that the points of shift of valve 147 will vary considerably depending on the degree of throttle valve opening as well as the particular output shaft speed at any given time.

Automatic, and substantially simultaneous, operation of the direct drive clutch D and the servo 58 for the forward drive planetary brake band 57 is accomplished by the reciprocatory shift of valve 147. It will be noted that "line" pressure, which is a relatively high, constant intensity, pressure fluid (90 p. s. i.) from supply conduit 119, is conducted to the inlet port 150 of direct clutch control valve unit 140 by the conduit 119a. "Line" pressure is supplied to conduits 119, 119a by the pumps 25 and/or 84 whenever the drive ratio selector valve 170 is set for either of the forward drive ratios DR or L respectively. At relatively low output shaft speeds (see Fig. 5) with the valve 170 set for drive, the "throttle" pressure in bore 145 at the left end of valve 147 will position the land 147c of valve element 147 across the "line" pressure inlet port 150 to prevent the transfer of "line" pressure fluid from conduit 119a through the bore portion 146 of valve 140 and out into the conduit 155. Conduit 155 has branch conduits 155b and 155c that are connected respectively to the apply side 44 of the direct drive clutch D and to the release side 58c of the servo 58. Thus whenever the transmission ratio control valve 170 is set for drive and shift valve 147 is in the position shown in Fig. 5, then "line" pressure is not admitted to valve bore 146 and conduit 155 from conduit 119a and drive will be through the torque converter A and the compounded forward underdrive gear trains 50, 60, due to direct drive clutch D being disengaged and brake band 57 being applied. Likewise, whenever the shift valve 147 is moved to the left to the position shown in Fig. 6, "line" pressure will be transferred from conduit 119a through valve bore 146 to conduits 155, 155b and 155c and accordingly direct drive clutch D will be applied and brake band 57 released so that a forward drive is then transmitted through the torque converter A and the locked up gear trains 50, 60 whereby a direct drive of almost a 1 to 1 ratio is transmitted to the output shaft 81. Automatic upshifts and downshifts between the direct drive and the underdrive ratios are accomplished by the hydraulically actuated, automatic, snap action shifting of the valve 147 with changes in the differential pressures or forces applied to opposite ends of the valve 147 due to the opposed "throttle" and "governor" pressures and the spring force applied to the valve element 147. In addition, driver controlled downshifts or kickdowns from the direct drive to the starting underdrive ratio can be accomplished by driver depression of the accelerator pedal 115 to a predetermined open throttle position such that the kickdown valving 230, previously mentioned and subsequently described, is brought into operation to accomplish the kickdowns or downshifts.

Admission of "throttle" pressure fluid to conduit 125 not only pressurizes branch conduit 125b and applies throttle pressure to the chamber 145 of direct clutch control valve 140, but in addition it also pressurizes the branch conduit 125a that is connected to bore 131 in the left end of the shuttle valve unit 130. Shuttle valve 130 (see Fig. 4) is a mechanism that insures smooth, quick, speed ratio changes and it comprises a valve disc 132 that is reciprocably mounted in the bore 131 of the body of valve 130. Disc 132 is connected by the compression spring 133 to the reciprocably mounted, stepped, piston valve element 134. The right end of piston valve 134 is slidably mounted in the valve bore 135 that is located at the right end of shuttle valve unit 130. Valve bore 135 is connected to the conduit 98 that receives "governor" pressure from the governor 85. As previously explained this "governor" pressure is proportional to the speed of the output shaft 81 of this transmission unit. It is thus thought to be apparent that the "throttle" pressure in valve bore 131 and the "governor" pressure in valve bore 135 of the valve unit 130 apply opposed forces to the plunger valve element 134 and provide for controlled reciprocation of the plunger valve element 134 within the valve unit 130. The reciprocatory movement of the shuttle valve element 134 within the shuttle valve body 130 is utilized to control the manner of application and release of the forward drive brake band 57 and the direct drive clutch D. The shuttle valve 130 and its manner of cooperation with the direct clutch shift control valve 140 does not form a part of this invention but is described in detail in the copending application of William L. Sheppard, Serial No. 254,531, filed November 2, 1951, now U. S. Patent 2,740,304.

From a consideration of Figs. 4–7, it is thought to be apparent that on movement of the drive ratio control valve element 174 from the Neutral to either the Drive or Low forward drive positions, that "line" pressure fluid will flow from supply conduit 191 through the drive ratio control valve 170, then through the conduit 119b to the shuttle valve inlet port 136 and also into branch conduit 119c. "Line" pressure may pass from conduits 119b and 119c into conduit 160 so as to apply the "line" pressure to the chamber 58b on the "apply" side of the forward underdrive planetary servo 58. Application of "line" pressure to chamber 58b of servo 58 applies the brake band 57 to drum 43 so as to activate the gearing 50, 60 of planetary gear box B for the transmission of the starting forward underdrive.

At closed or idle throttle (see Fig. 4) the throttle actuated valve 120 is substantially closed to prevent the supply of any significant "throttle" pressure to the conduit 125 and branch conduits 125a and 125b. Accordingly, at closed throttle there is no significant "throttle" pressure transmitted from branch conduit 125a through the shuttle valve bore 131 to the conduit 161 that is connected to the chamber 58a that is also on the apply side of servo 58. Thus at closed throttle there is no significant "throttle" pressure in servo chamber 58a assisting the "line" pressure in chamber 58b to apply the underdrive brake band 57 to drum 43. However, as soon as the accelerator 115 is depressed to initiate forward drive, then "throttle" pressure of a progressively rising intensity is passed through valve 120 and connected conduits 125a, 161 to the chamber 58a on the "apply" side of servo 58 to assist the "line" pressure in chamber 58b in anchoring the brake band 57 to the drum 43. With the disclosed arrangement it is apparent that as the load that is applied to the output shaft 81 is increased, the accelerator 115 must be further depressed to increase the torque to overcome the load. Depressing the accelerator opens throttle valve 120 and increases the intensity of the "throttle" pressure transmitted to line 161 and to servo chamber 58a so that brake band 57 will be anchored by means that hold in proportion to the load applied. This results from the fact that the variable "throttle" pressure band applying force in servo chamber 58a supplements and assists the "line" pressure band applying force in chamber 58b.

The nucleus of the invention described and claimed herein resides in the differential pressure, bleed type, unit shift valve 140. From a consideration of Figs. 4–8 it will be noted that the left end of the plunger type shift valve element 147 of valve 140 is pierced by an axially extending counterbore 151. This counterbore 151 is crossed by a transversely extending crossbore 152 in the neck region between the valve lands 147a and 147c. The counterbore 151 thus not only provides a seat for the valve spring 149 at the left end of the valve 147 but in addition it cooperates with the crossbore 152 to provide a conduit means for transferring or transmitting pressurized fluid between the valve bore chamber 145 at the left end of the valve bore 146 and the portion of valve bore 168 located between valve lands 147a and 147c. This conduit means composed of the valve bores 151 and 152 is an essential part of the shift valve unit structure that provides for snap action shift of the shift valve element 147 as will be subsequently explained in detail.

Connected to the valve bore 146 between the left end bore chamber 145 and the "line" pressure inlet port 150 is a vent port 153 that leads into a branch or by-pass conduit 154. By-pass conduit 154 is connected through a restriction orifice 163 to the chamber 164 of the kickdown valve unit 230. Chamber 164 of kickdown valve unit 230 is separated from the chamber 142 of this kickdown valve unit by a spring supported, plate-type, valve element 165. The operation of the plate-type kickdown valve element 165 will be completely described subsequently when Fig. 8 is referred to in detail.

Branch or by-pass conduit 154, between the port 153 and the restriction 163, is connected by a restriction orifice 166 to the "line" pressure supply line 219a. "Line" pressure supply conduit 219a is connected by conduit 219 to the Low port of the drive ratio selector valve 170. Accordingly, whenever the drive ratio selector valve 170 is set for the Low ratio drive, conduits 219, 219a and 219b are supplied with "line" pressure of approximately 90 p. s. i. At all other times the conduits 219, 219a and 219b merely provide a drain conduit means that empties into the pressure fluid supply sump 26 through the vent port V at the right end of valve unit 170. Conduit 219a has a branch conduit 219c that is connected to the chamber 167 of the valve bore 146 of the valve unit 140. With the arrangement shown it is possible to pressurize the chamber 167 of valve bore 146 with "line" pressure whenever the valve 170 is set for the Low ratio drive whereupon the "governor" pressure that is directed into valve chamber 148 at the right end of valve 140 will be unable to upshift the valve 147 towards the left and the transmission control system will be locked in the Low drive ratio. This is more clearly explained when Fig. 7 is specifically described.

From the above description of the differential pressure, bleed-type, unit shift valve 140 it will be seen that the "throttle" pressure supplied to valve unit 140 by conduit 125b is controlled by three restriction orifices 143, 163 and 166 respectively and by the movement of the reciprocable, plunger-type, valve element 147 that is positioned between the orifices 143 and 166. When the drive ratio selector valve 170 is in Neutral with the engine operating, the drive ratio control valve 174 and the shift control valve 147 are located as shown in Fig. 4. "Line" pressure can not be supplied to conduits 119, 119a and 119b under such conditions due to the position of valve lands 172 and 173 of valve 174 so servo 58 can not apply band 57 to activate the gear trains 50, 60 for the transmission of a forward drive. Likewise, "line" pressure can not be passed through valve 170 to the conduit 225 to cause servo 68 to apply band 67 so as to activate gear train 60 to provide for the transmission of a reverse drive.

If the drive ratio selector valve 170 is set for drive as shown in Fig. 5, then "line" pressure is supplied to conduits 119, 119a and 119b as well as to conduit 160 and the servo 58 will apply band 57 and condition the gearing 50, 60 for a starting forward underdrive ratio. Prior to movement of the vehicle in the drive ratio, the valve 147 will still be positioned as shown in Fig. 4 and throttle pressure, which may vary from 15 p. s. i. to 90 p. s. i. is passed through conduits 125, 125b, chamber 142, restriction orifice 143, through conduit 144 into chamber 145 of valve bore 146 and through the bores 151, 152 of the valve 147 into the bore portion 168 located between valve lands 147a and 147c. Prior to movement of the vehicle, "governor" pressure is not directed into valve bore 148 at the right end of valve 147 so that valve 147 remains in the downshifted position shown in Fig. 4 due to the forces of the spring 149 and the "throttle" pressure applied to the left end of valve 147. In the Fig. 4 position of valve 147, the throttle pressure in valve bore portions 145 and 168 can not pass to the port 153 and out into conduit 154 for the valve land 147a covers port 153. However, as the vehicle begins to move forward in the forward underdrive ratio with opening of the throttle valve 120, an increased "throttle" pressure is supplied to valve bore chamber 145 and an increasing "governor" pressure is supplied to valve bore chamber 148. As the vehicle speed increases the "governor" pressure supplied to the chamber 148 at the right end of valve 140 produces a force on the right end of valve 147 that overcomes the combined forces of the spring 149 and the "throttle" pressure applied to the left end of valve 147 and then the valve 147 beings to shift towards the left as shown in Fig. 5. After a predetermined leftward movement of the valve 147, due to the force of the "governor" pressure in chamber 148, the valve land 147a will uncover the port 153 and permit the "throttle" pressure in bore portion 168 to pass out through port 153 into the conduit 154. The pressurized fluid passed through port 153 to conduit 154 can pass through restriction 163 into the closed chamber 164 of the kickdown valve unit 230. The pressurized fluid passed into conduit 154 can also pass through the restriction orifice 166 and then out into the drain conduits 219a, 219 that drain through the open vent V at the right end of valve 170 if valve 170 is set for drive. It will be seen then that the "throttle" pressure applied to the left end of the valve 147 during accelerator depression, is drained to sump 26 through the pair of series arranged substantially identical, restriction orifices 143, 166 after a predetermined leftward shift of the valve 147 by the force of the "governor" pressure applied to valve bore chamber 148 at the right end of valve 147. With the uncovering of the valve port 153 by the leftward shift of the valve 147, the pressure of the fluid entrapped between the series arranged, identical restriction orifices 143, 166 is immediately reduced to approximately one-half (½) of the then existing "throttle" pressure in the "throttle" pressure supply conduit 125b. This reduction in pressure of the pressurized fluid entrapped between the series arranged, identical, restriction orifices 143, 166 is in accordance with accepted theory of hydraulic flow and this theory is mathematically proven in the description following. For the time being it will be more important to consider the effect of this sudden reduction in the pressure of the "throttle" pressure located between orifices 143 and 166 with uncovering of the escape port 153 after a predetermined leftward shift of valve 147. Prior to uncovering of port 153 the "throttle" pressure in chamber 145 and the force of spring 149 were opposing the "governor" pressure in chamber 148. On uncovering the port 153 the pressure of the fluid in chamber 145 is reduced to approximately one-half (½) its former value due to the escape of this pressurized fluid through orifice 166 so immediately the "governor" pressure force applied to the right end of valve 147 overcomes the reduced resultant force applied to the left end of valve 147 and the valve 147 is snapped towards the left to the upshifted position shown in Fig. 6.

It should be noted from Fig. 5 that even though the port 153 has been uncovered, so as to set up the differential pressure bleed action of the "throttle" pressure from conduit 125b through the series arranged orifices 143, 166, that still the vent port 169 for the direct drive clutch D and the "off" chamber 58c of the servo 58 is still open. By keeping vent port 169 open until after the differential pressure bleed action actually begins, premature application of the clutch D is prevented and there is no danger of burning out clutch D due to slip engagement of the clutch D as a result of trapping of fluid in the conduits 155, 155b.

As the valve 147 shifts to the left from its downshifted to its upshifted position, there are more or less three stages of movement or force equilibrium set up. First, the "governor" pressure in chamber 148 is opposed by the full "throttle" pressure in chamber 145 plus the force of spring 149. Second, after uncovering of the port 153 by a predetermined leftward shift of valve 147, the "governor" pressure in chamber 148 is opposed by only one-half (½) the throttle pressure plus the force of spring 149 so a snap action shift force directed towards the left is created. Third, after full snap over of the valve 147 to its Fig. 6 upshifted position, the "governor" pressure in chamber 148 is opposed by merely the force of the spring 149 due to the fact that valve land 147a of valve 147 in upshift position of the valve 147 covers the port 177 that connects the "throttle" pressure supply conduit 144 to the valve chamber 145.

At this time it might be appropriate to consider the theory behind the development of the reduced differential pressures resulting from the bleeding of the "throttle" pressure through the series arranged, similar, restriction orifices 143, 166 after the shift valve 147 has shifted to the left sufficiently to uncover escape port 153.

According to accepted theory of fluid flow through an orifice the rate of flow ("Q" cu. ft./sec.) is equal to the product of the velocity of flow ("V" ft./sec.) and the cross-sectional area of the flow conduit ("a" sq. ft.). In addition, it is accepted that the velocity is directly proportional to the square root of the pressure drop ("dh") expressed in ft. of pressure head of the fluid in question across the orifice.

Expressed in equation form, $$Q = Va = ac\sqrt{2gdh}$$

where "$g$" is the acceleration of gravity in ft./sec.$^2$ and "$c$" is a flow coefficient embodying the effects of entrance and exit conditions of the orifice. "$dh$," in turn, may be defined as the pressure drop ("$dP$" expressed in lbs./sq. ft.) divided by the fluid density ("$p$" lbs./cu. ft.) Then $$Q = ac\sqrt{2g\frac{dP}{p}}$$

Assuming then that two orifices $O_1$ and $O_2$ (which represent the connected orifices 143 and 166 in the drawings) each have comparable entrance and exit conditions and that they are placed in series in a fluid circuit as diagrammatically shown in Fig. 12, then the flow coefficient, "$c$," would be the same for both orifices $O_1$ and $O_2$.

The pressure drop across orifice $O_1$ is $dP_1 = P_1 - P_2$ and the pressure drop across orifice $O_2$ is $dP_2 = P_2 - P_3$. Let $A_1$ and $A_2$ equal the areas of the orifices $O_1$ and $O_2$ respectively and let $V_1$ and $V_2$ equal the velocities of the fluid passing through the orifices $O_1$ and $O_2$ respectively.

Because the same quantity of fluid passes through both orifices, $$Q = A_1 V_1 = A_2 V_2$$

But $$V_1 = C\sqrt{2g\frac{dP_1}{p}}$$

and $$V_2 = C\sqrt{2g\frac{dP_2}{p}}$$

Then $$A_1 C\sqrt{2g\frac{dP_1}{p}} = A_2 C\sqrt{2g\frac{dP_2}{p}}$$

and $$\frac{A_1}{A_2} = \sqrt{\frac{2g\frac{dP_2}{p}}{2g\frac{dP_1}{p}}} = \sqrt{\frac{dP_2}{dP_1}}$$

For example, then, if the two orifices $O_1 O_2$ are the same size and if $P_3$ is assumed to be zero, $$A_1 = A_2$$
$$dP_1 = dP_2$$
$$P_1 - P_2 = P_2 - P_3 = P_2 - 0$$
$$P_2 = \tfrac{1}{2} P_1$$

In the valve unit 140 herein disclosed the series arranged, restriction orifices 143 and 166 are of substantially the same size and shape and may be considered substantially identical as far as influence on fluid flow therethrough is concerned. In certain transmission control systems utilizing this invention, the conduits containing the restrictions corresponding to orifices 143 and 166 have been approximately .188 inch in diameter whereas the orifices 143 and 166 located in these conduits were each .043 inch in diameter. The restriction orifice 163 in the conduit 154 of such a system must necessarily be larger than the restriction orifices 143 and 166 for a reason that will subsequently become apparent. It has been found that a diameter of .063 inch for the restriction orifice 163 is satisfactory when restrictions 143 and 166 are each .043 inch in diameter. With dimensions such as those set forth herein or where the ratio of sizes is in a similar range, it has been found that the pressure reduction in the conduit between the orifices 143, 166 on leftward shift of the valve 147 after uncovering of the escape port 153 is substantially one-half of the throttle pressure that existed in this same conduit portion just prior to uncovering of the escape port 153 on leftward shift of the valve 147 from its downshifted to its upshifted position.

From a consideration of the formula previously set forth relative to the calculation of the pressure drop in the conduit between the series arranged orifices 143, 166, it is thought to be obvious that by a proper selection of relative sizes for the orifices 143 and 166 it is possible to secure approximately any desired pressure drop in the conduit extending between these orifices. Accordingly, the snap action shift of the valve 147 can be controlled so as to insure proper functioning of this valve. In the present instance a pressure drop of about one-half (½) the existing "throttle" pressure has been found satisfactory to insure snap action shift of the valve 147 under all conditions of upshift and downshift encountered by a motor vehicle operating with a power transmission unit of the type disclosed.

Based upon the description of the upshift action of the valve 147, it is thought to be more or less apparent that the automatic downshift of the drive ratio shift control valve 147 is accomplished as a result of action just the reverse of that which occurs during automatic upshift. Considering first Fig. 6, which shows the valve 147 in its upshifted position, it will be noted that valve land 147a then covers "throttle" pressure inlet port 177 so that "throttle" pressure can not enter the valve chamber 145. Accordingly, the compressed spring 149 provides the only force acting on the left end of the valve 147 that tends to downshift the valve 147 towards the right. At this time the force of the "governor" pressure in the chamber 148 at the right end of valve 147 is opposing the force of the compressed spring 149 at the left end of valve 147 and these are the only axially directed forces acting on the valve 147. As the vehicle speed decreases the "governor" pressure will automatically decrease and eventually the force of the spring 149 will overcome the force of the "governor" pressure so that the valve 147 will begin to shift towards the right. After a predetermined rightward shift from the Fig. 6 upshifted position of valve 147, the valve land 147a will uncover the "throttle" pressure inlet port 177. As soon as the "throttle" pressure inlet port 177 is uncovered the "throttle" pressure from conduit 144 passes into the chamber 145 and through the valve bores 151 and 152 and out through escape port 153 to the conduit 154 and thence through the restriction orifice 166 into the drain conduit 219a. Thus on uncovering of "throttle" pressure inlet port 177 the pressure of the fluid admitted to the aforementioned conduit path between the restriction orifices 143 and 166 is raised from zero to approximately one-half (½) the "throttle" pressure then existing in the conduit 125b on the downstream side of the restriction orifice 143. As a result of the uncovering of the "throttle" pressure inlet port by the initial rightward shift of valve 147, the force of the newly developed "differential" pressure trapped between orifices 143, 166, that is that resulting from one-half (½) of the "throttle" pressure admitted to chamber 145, is suddenly added to the force of the compressed spring 149 and thus a suddenly increased force is applied to the left end of valve 147 that effects a snap action downshift of valve 147 towards the right end of valve bore 146. At the completion of the downshift of valve 147 the valve 147 is located in the bore 146 in the position shown in Fig. 4. At this time the valve land 147a is covering the escape port 153 so now the bleed of the "differential" pressure from chamber 145 through the restriction orifice 166 to drain 219a is terminated and full "throttle" pressure builds up in the chamber 145 at the left end of valve 147. After downshift of valve 147 to the Fig. 4 position, the force acting on the left end of valve 147 is again the force of full "throttle" pressure plus the force of the spring 149. The force of the "governor" pressure applied to valve chamber 148 at the right end of valve 147 must overcome both of the existing forces applied to the left end of valve 147 in order to initiate upshift of valve 147 to the Fig. 6 position. A very important feature of this automatic shift control valve 140 is the arrangement whereby false or unintended downshifts from the direct drive (Fig. 6) to the underdrive position (Fig. 4) are prevented when the throttle valve 120 is suddenly opened. It will be noted that when the valve 147 is upshifted (Fig. 6) that the "throttle" pressure inlet port 177 is covered by valve land 147a so opening the "throttle" valve 120 does not admit throttle pressure to bore 145 or increase the force applied to the left end of valve 147 that tends to downshift the valve 147 to the right. On the contrary only the force of the spring 149 at the left end of valve 147 opposes the force of the "governor" pressure applied to the right end of the valve 147 when valve 147 is upshifted and when the vehicle speed has dropped sufficiently to permit spring 149 to shift valve 147 to the right enough to uncover port 177, then the automatic downshift occurs. This feature of the valve 140 prevents unnecessary upshifts and downshifts of the transmission, eliminates engine racing and tends to improve transmission performance as well as increase transmission life.

It will be noted from a consideration of Fig. 6 that as the valve 147 is moved towards the right to initiate downshift that after a very slight rightward movement the "throttle" pressure inlet port is uncovered and that immediately the so-called "differential" pressure will develop in valve bore chamber 145. While a slight rightward movement of the valve 147 uncovers the "throttle" pressure inlet port 177 still this same rightward movement does not close off the "line" pressure supply port 150 for the clutch D or open the vent port 169 for the line pressure conduit 155. As a result of this arrangement the snap action "differential" pressure force can fully develop in bore chamber 145 before the clutch D is released or the brake band 57 applied and undesirable slipping of these friction elements is prevented.

As previously pointed out with regard to the automatic upshift of valve 147, there is also a three stage force equilibrium pattern developed during the automatic downshift. First, the force of spring 149 alone opposes the "governor" pressure generated force applied to the right end of valve 147. Second, after a slight rightward shift of valve 147 with reduction in vehicle speed and consequently "governor" pressure, the uncovering of the "throttle" pressure inlet port 177 applies the force of approximately one-half (½) "throttle" pressure to the left end of valve 147 to assist the force of the spring 149 in overcoming the "governor" pressure force applied to the right end of the shift control valve 147 and this brings about snap action downshift of the valve 147 to the right end of valve bore 146. Third, on movement of the valve 147 to the right end of the bore 146, the escape port 153 is covered by valve land 147a and now the force of full "throttle" pressure is applied to the left end of valve 147 to assist the force of spring 149 in opposing the "governor" pressure generated force applied to the right end of valve 147. With the control valve 140 controlling the transmission shown herein, it is possible to obtain an automatic upshift at any vehicle speed between 14 and 62 M. P. H. depending on the throttle opening. Automatic downshifting will usually occur at about 13 M. P. H. at closed throttle.

It is thought to be quite clear that the shift of valve 147 between its downshifted and upshifted positions controls the passage of "line" pressure fluid from the supply conduit 119a through the valve bore 146 to the conduit 155 which connects to the "apply" bore 44 of the direct drive clutch D and the "off" chamber 58c of the forward drive control servo 58. Likewise, shift of valve 147 controls the venting of the "line" pressure fluid supplied to conduit 155 for the movement of valve land 147d across the vent port 169 controls drain of the "line" pressure fluid from clutch D and servo chamber 58c back into the supply sump 26 through the vent port 169. A pressure control bleed valve 240 is associated with the vent port 169 to control the rate of flow of the "line" pressure fluid out of conduit 155. This bleed valve 240 forms no part of this invention so description thereof is thought to be unnecessary. However, a complete description of this valve 240 appears in the said co-pending application of W. L. Sheppard, Serial No. 254,531 filed November 2, 1951, now U. S. Patent 2,740,304.

The aforementioned description of the operation of shift control valve 140 covers the normal automatic operation of the transmission control system when drive is initiated through the usual forward, starting drive ratio. From an inspection of Figs. 9 and 10, as well as Fig. 4, it will be noted that another forward starting drive ratio, namely low, is also provided and this low ratio is also under the control of the shift control valve 140. Low ratio is utilized particularly for starting drive under extremely difficult circumstances. This low ratio drive would be used when it might be desirable to rock the vehicle by quickly shifting between the low and reverse drive ratios. A consideration of Fig. 9 shows that the low and reverse positions of the ratio control lever 111 are in the same plane so such a shift as between low and reverse can be quickly and easily accomplished. Low ratio is also available for use as a coasting ratio when descending steep hills or the like. When the transmission control system is to be set for low the shift lever 111 is manually moved to the low position on the shift quadrant 250 and this shifts the drive ratio control valve 174 to the position shown in Fig. 7. As will be seen from the subsequent description, the shift control valve 147 will then be locked in the downshifted position shown in Fig. 4. In this, low ratio, drive is always through the torque converter A and the compounded underdrive gear trains 50, 60 of the gear box B. The drive transmitting train in low is the same as the normal starting drive train employed when starting in the drive ratio. However, when starting in the low ratio, provision is made in the control valving to prevent any automatic upshift of valve 147 to attain the direct drive ratio that would be achieved upon the engagement of the clutch D and the release of bands 57 and 67.

From Fig. 7 it will be noted that when the drive ratio control valve 174 is placed in the low position that "line"

pressure from supply conduit 191 can pass through valve bore 171 of the ratio control valve 170 and out into both conduits 119 and 219. "Line" pressure fluid entering conduit 119 passes into conduit 119a and up to valve 140. However "line" pressure from conduit 119a never passes through the valve 140 to the conduit 155 when the control 111 is set for low ratio, for shift valve 147 will be locked in the downshifted position (shown in Fig. 4) so as to cover "line" pressure supply port 150. The means for locking the shift valve 147 in the downshifted position is described below. When set for low, "line" pressure from conduit 119 also passes into the branch conduits 119b and 119c from whence it is directed through the shuttle valve 130 into conduit 160 which applies the "line" pressure to the "on" chamber 58b of the servo 58. "Line" pressure in servo chamber 58b effects application of the brake band 57 to activate the compounded planetaries 50, 60 for the forward underdrive ratio that is the same as the starting ratio in drive. When set for low, "line" pressure passes through valve bore 171 of the drive ratio control valve 170 and out into the conduit 219 from whence it is passed into branch conduit 219a and then through branch conduit 219c into valve bore chamber 167 of the shift control valve 140. "Line" pressure in the chamber 167 of valve 140 acts on the inner side of valve land 147b of shift valve 147 and opposes the "governor" pressure applied to the outer side of valve land 147b. In addition, the "line" pressure in branch conduit 219a also forces the ball valve 260 to the left and unseats it so that "line" pressure can pass through the unseated valve 260 into conduit 144 and up into the chamber 145 at the left end of valve 147. From the above description it is seen that the force of the "line" pressure in valve bore chambers 145 and 167 cooperates with the force of the spring 149 to oppose the force of the "governor" pressure applied to the right end of valve 147. As the "line" pressure is always equal to or greater than the "governor" pressure, the valve 147 will be held or locked in its downshifted position whenever the drive ratio control valve 170 is set for low ratio and thus low will continuously provide an underdrive ratio regardless of car speed or the degree of throttle valve opening.

The low ratio is obtained by a manual shift of the drive ratio control valve 174 to the low position as described above. As the shift control valve 147 is locked in downshifted position when low ratio is being used, it is never possible to automatically upshift from low to the forward drive ratio. Drive is obtainable by manually placing the drive ratio selector lever 111 and the connected valve 174 in the drive position. However, after starting in low it is possible to subsequently shift the drive ratio selector lever 111 to the drive position at any time and the forward drive will be continued in a smooth, uninterrupted fashion in the drive ratio. After the shift from low to drive, the drive train that carries on may be either the forward underdrive ratio or the direct drive ratio depending on the vehicle speed and the amount of throttle valve opening at the time of the shift from the low ratio.

It is also possible to manually downshift from the drive ratio to the low ratio in order to secure coast braking in low underdrive ratio. Downshifts to low from drive are quite advantageous when operating in either hilly or mountainous country as they provide a means for reducing the amount of driver braking required and in addition such a shift assists in keeping the vehicle under the full control of the operator. This downshift from drive to low may be accomplished at any time regardless of vehicle speed or the degree of throttle valve opening.

Fig. 8 shows the condition of the elements of valve unit 140 immediately after the accelerator pedal 115 has been depressed to substantially its limit of throttle opening movement. In many instances while traveling along in the cruising direct drive of the drive ratio it may be necessary or advantageous to effect an immediate downshift to the underdrive ratio in order to get a more favorable accelerating ratio. This shift may be readily accomplished by merely depressing the accelerator 115 to a point corresponding to the wide open position of the carburetor throttle or at least depressing the accelerator to a position corresponding to within the last five (5) or ten (10) degrees of wide open position of the engine throttle control. On depressing the accelerator 115 to the aforementioned limiting position, the linkage 117 (see Fig. 9) will rotate cam 117a counterclockwise and cause the finger 117b of cam 117a to engage the plunger rod 231 of the shift control valve 140 and move rod 231 towards the left. Movement of plunger rod 231 to the left will cause it to unseat the plate-type valve 165 of kickdown valve assembly 230 and permit the "throttle" pressure fluid of maximum intensity (approx. 90 p. s. i.) in chamber 142 of valve 230 to enter the adjacent chamber 164 and then pass through the restriction orifice 163 into the conduit 154 that connects with the port 153 of the valve bore 146. "Throttle" pressure passing through port 153 into valve bore 146 enters the bores 152 and 151 respectively of the shift control valve 147 and is passed therethrough into the chamber 145 at the left end of valve 147. Thus with a sudden full depression of the accelerator 115, the force developed by the compensated "throttle" pressure fed through opened kickdown valve 165 is applied to the left end of valve 147 to assist the spring 149 in downshifting the valve 147 toward the right. The pressure fluid fed through opened kickdown valve 165 and supplied to the chamber 145 at the left end of valve 147 is a reduced or compensated "throttle" pressure the pressure of which is dependent on the sizes of the restriction orifices 163 and 166. It will be noted that when kickdown valve 165 is unseated by the plunger rod 231 that the "throttle" pressure fed through restriction orifice 163 not only passes into the chamber 145 of the valve bore 146 but in addition it passes through the restriction orifice 166 and out through the drain conduit 219a to sump 26. Here again is a pair of restriction orifices arranged in series and the resulting pressure of the fluid trapped between the orifices 163 and 166 can be calculated in the same manner as previously set forth relative to the calculation of the pressure of the differential fluid trapped between the restriction orifices 143 and 166 during normal upshifts and downshifts when operating in the drive ratio. In the present instance the restriction orifice 163 is approximately .063 inch in diameter whereas restriction orifice 166 is only .043 inch in diameter. With such a relationship in size of the series arranged orifices 163, 166, it is thought to be obvious that the compensated or differential pressure fluid trapped between these orifices will be greater than one-half (½) the "throttle" pressure utilized for effecting the snap action shift of the valve 147 but somewhat less than the full throttle pressure. As a kickdown is accomplished by substantially a full depression of the throttle valve accelerator 115, it is obvious that the "throttle" pressure fed to chamber 164 at this time will be at its maximum value and substantially equal to the "line" pressure which is normally about 90 p. s. i. The differential or compensated pressure fluid fed into the chamber 145 of valve bore 146 during a kickdown will thus be somewhere between 45 and 90 p. s. i. if the sizes of the orifices 163 and 166 are approximately equal to those hereinbefore set forth. It is thought to be obvious that the intensity of the differential pressure applied to chamber 145 during a kickdown can be readily varied by varying the sizes of the orifices 163 and 166. Furthermore, by a consideration of the valving 140 and its method of functioning, it is thought to be apparent that the ratio of the sizes of the orifices 163 and 166 will control the upper limit or maximum vehicle speed at which a kickdown may be secured. As the sizes of the orifices 163, 166 control the pressure of the differential fluid supplied to chamber 145 during a kickdown, they thus control the force applied to the left end of the valve 147 and this force must be such that when it is combined with the force of the spring 149 it will overcome the force of the "governor" pressure applied to the right end of valve 147 in order to effect a kickdown of the valve 147. With the orifice sizes specified kickdowns can be secured up to approximately 52 miles per hour when the transmission is operating in the drive ratio. It will be noted from a consideration of Fig. 8 that the kickdown valve unit 230 is designed such that it tends to prevent an accidental kickdown during normal accelerator depression. As the accelerator 115 is depressed it normally acts against the force of its return spring 115a (see Fig. 4) and against the force exerted by the "throttle" pressure fluid in the chamber 123a at the left end of valve 120. However, after the accelerator 115 has been almost fully depressed the finger 117b of its linkage 117 engages rod 231 and moves it against the kickdown valve 165. Valve 165 is held on its seat by the spring 232 and by the force exerted by the "throttle" pressure fluid in the chamber 142 of kickdown valve 230. Thus to accomplish the kickdown a sufficient additional force must be applied to the accelerator 115 to overcome the force of the "throttle" pressure in chamber 142 and the spring 232 in addition to that required to normally depress the accelerator. This arrangement of the valve element 165 provides a dual function for the kickdown valve 230 that is quite advantageous from an operational standpoint.

Reverse drive (see Fig. 4) is obtained by manually shifting the drive radio selector valve 174 to the left so as to connect "line" pressure supply conduit 191 with the reverse drive pressure supply conduit 225. Pressurizing conduit 225 activates servo 68 and applies the reverse drive brake band 67. Reverse servo 68 is described in detail in William L. Sheppard application Serial No. 211,300 filed February 16, 1951, now U. S. Patent 2,633,712. It will be noted that neither of the conduits 119 nor 219 receive "line" pressure when the drive ratio selector valve 174 is in reverse drive position so the other control valving 120, 130, 140, 230, associated with conduits 119 and 219, are also inactive when reverse drive is being transmitted. It will be found that the "line" pressure regulator valve 185 of this transmission control system provides a "line" pressure of 180 p. s. i. or double the forward drive "line" pressure (90 p. s. i.) when the transmision is set for reverse drive. William L. Sheppard co-pending application Serial No. 98,493 filed June 11, 1949, now U. S. Patent 2,697,363, previously referred to, contains a complete description of the line pressure regulator control valve 185. Valve 185 forms no part of this invention.

From a consideration of Fig. 9 it will be noted the shift pattern for the drive ratio selector lever 111 is a two plane arrangement wherein the lever 111 is raised above its normal plane to position it in either reverse or low. Also reverse and low are in the same raised plane so the lever 111 can be easily and quickly swung between low and reverse to effect rocking of the vehicle to drive out of a rut or the like. It will also be noted that to move the drive ratio selector lever 111 from neutral to either of the forward drive ratios drive or low, does not require pasasge of the lever 111 through the reverse drive position. Likewise, reverse drive can be obtained without passing the drive ratio lever 111 through either of the forward drive ratio positions. Such an arrangement prevents accidents that might otherwise occur due to sluggish operation of the transmission controls in cold weather. Fig. 10 is a fragmentary plan elevation of the shift lever control quadrant 250 that corresponds to the Fig. 9 design.

Fig. 11 is a fragmentary side elevation of a vehicle power plant embodying this invention and corresponding to Figs. 1–4. The engine E has a downdraft type carburetor 270 that includes a revolvable engine control throttle valve 271. Carburetor throttle valve 271 is connected to the linkage 117 that is operated by the accelerator pedal 115. Linkage 117 is also connected to the linkage 116 that operates the throttle valve 120 of the transmission control valving. Each of the control valve units 120, 130, 140, 170, 185, 230 are formed as integral parts of a valve body 300. The valve body 300 is detachably mounted on the underside of the transmission gear box casing 42 as shown in Fig. 11. This arrangement permits the drain ports or vents of the several control valves to spill directly into the transmission oil sump 26 so that the control system fluid may be readily recirculated by the pumps 25 and 84. Valve body 300 has the drive ratio control valve 170 thereof connected through linkage 113 to the shift lever 111 so that the various driving ratios may be manually selected by the vehicle operator. The several valves of the control system for this power transmission unit are contained within the valve body 300 (see Figs. 13, 14, 15 and 16) that is detachably mounted by means of its support plate 301 in the sump area 26 beneath the gearing of the gear box B. As valve body 300 is enclosed by gear box housing 42 and the housing pan 302, it is obvious that oil vented from the several vents V of the valve body 300 will be discharged into the sump 26 such that it may be recirculated by the pumps 25 and 84 after the oil has passed through the strainer 299.

Valve body 300 includes a removable cover or end plate 305 that has recesses therein to provide the bore chambers 145, 131 and 142 for the shift control valve 140, the shuttle valve 130 and the kickdown valve 230 respectively. The arrangement of the several valves within the valve body 300 is thought to be quite obvious from an inspection of Figs. 13–15 and a consideration of Figs. 5–8. Operation of the several valves by the vehicle driver is accomplished through actuation of a pair of relatively rotatable shafts 306 and 307 that are concentrically ararnged within the valve body 300. From an inspection of Fig. 11 it will be noted that suitable linkage is connected to each of these rotatable shafts 306 and 307 such that movement of the drive ratio control lever 111 and the accelerator 115 will respectively operate linkage 113 and 116. Movement of the drive ratio control lever 111 causes linkage 113 to rotate the shaft 306 and turn the attached lever plate 308 in an arc about shaft 306. Lever plate 308 has a finger 309 that is engaged with the drive ratio control valve element 174 so that movement of lever 111 will control the position of valve 174 within its bore in the valve body 300. A spring detent mechanism 310 is provided to lock the lever plate 308 in each of its selected positions.

The accelerator pedal 115 is connected by the linkage 117, 117c to the engine carburetor throttle valve 271 and by the linkage 117, 117d to the shaft 307 of valve body 300 such that depression of accelerator 115 will cause rotation of the shaft 307 clockwise. Lever plate 117a is drivingly connected to the shaft 307 and thus it is thought to be obvious that depression of accelerator 115 will cause the cam surface or edge 117e of plate 117a to actuate the lever linkage 116 and operate the throttle responsive valve element 121 of the throttle valve 120. As cam plate 117a carries the finger element 117b, it is throught to be obvious that a more or less full depression of the accelerator 115 will move the finger 117b of plate 117a into engagement with the kickdown valve push rod 231 such that push rod 231 will unseat kickdown control valve 165 and apply throttle pressure to chamber 145 of valve 140 so as to effect a downshift to the right (see Fig. 8) of the valve 147.

The kickdown valve unit 230 of this transmission control system provides a hydraulic means for preventing accidental kickdown during normal operation of the throttle valve accelerator pedal 115. It will be noted from Fig. 8 that when the valve 147 of shift control valve 140 is in its upshifted or direct drive position, that then chamber 142 is filled with throttle pressure fluid and furthermore, on opening the throttle valve to cause a kickdown this throttle pressure in chamber 142 will be approximately 90 p. s .i. Accordingly, the throttle pressure in chamber 142 provides a substantial force that tends to hold kickdown valve 165 seated. To unseat valve 165 by the movement of plunger rod 231 against valve 165 thus requires a substantial effort on the part of the vehicle operator over that normally required for accelerator depression. In addition the spring force of spring 232 must be overcome. The additional effort that must be expended by the driver to accomplish a kickdown prevents accidental kickdowns.

From the above description it is thought to be apparent that the disclosed structure provides a novel system of control valving for a hydraulically operated motor vehicle transmission or the like which valving is designed for simplicity, dependability and economy of manufacture as well as long service. One of the features of the unitary shift control valve unit 140 that insures dependability and a long service life of this unit is the design of the valve element 147 whereby practically all its valve land surfaces are completely exposed to either the pressure fluid supply or vent ports of the valve 140 during normal shifting movement of the valve element 147 in the valve bore 146. As a result of this arrangement of the valve lands and the associated fluid ports, the valve lands are continuously wiped and/or washed during axial reciprocation of the valve element 147 so as to clean these surfaces of any dirt or other foreign matter that might pass through the system. As a result, it is practically impossible for the valve element 147 to become stuck in the valve bore 146 due to foreign matter becoming wedged between the valve lands and the encircling walls of the valve bore 146. Accordingly, the possibility of a stuck shift control valve is practically eliminated when a valve of the disclosed type is utilized in a hydraulic control system.

We claim:

1. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit comprising a reciprocable valve connected to said first conduit means so as to control the supply of line pressure fluid to the said control mechanisms, a source of pressure fluid having a pressure responsive to the speed of the motor vehicle, a second conduit means connecting said source of vehicle speed responsive pressure fluid to a first portion of said differential pressure operated valve, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second portion of the differential pressure operated valve in a manner whereby the vehicle speed responsive pressure fluid and the throttle valve responsive pressure fluid exert opposing forces upon the differential pressure operated valve to effect reciprocation thereof, and a resilient means arranged to continuously exert a force on the differential pressure operated valve that opposes the force of the speed responsive pressure fluid, said differential pressure operated valve being movable by said vehicle speed responsive pressure fluid to a first limiting position wherein the application of the throttle valve responsive fluid to said valve is prevented.

2. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit comprising a reciprocable valve connected to said first conduit means so as to control the supply of line pressure fluid to the said control mechanisms, a source of pressure fluid having a pressure responsive to the speed of the motor vehicle, a second conduit means connecting said source of vehicle speed responsive pressure fluid to a first portion of said differential pressure operated valve, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second portion of the differential pressure operated valve in a manner whereby the vehicle speed responsive pressure fluid and the throttle valve responsive pressure fluid exert opposing forces upon the differential pressure operated valve to effect reciprocation thereof, and a resilient means arranged to continuously exert a force on the differential pressure operated valve that opposes the force of the speed responsive pressure fluid, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in a first limiting position and covered when said differential pressure operated valve is in a second limiting position, and a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions.

3. In a hydraulically operated control system as set forth in claim 2 wherein the first and second restriction orifices are substantially identical in size and shape.

4. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit comprising a reciprocable valve connected to said first conduit means so as to control the supply of line pressure fluid to the said control mechanisms, a source of pressure fluid having a pressure responsive to the speed of the motor vehicle, a second conduit means connecting said source of vehicle speed responsive pressure fluid to a first portion of said differential pressure operated valve, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second portion of the differential pressure operated valve in a manner whereby the vehicle speed responsive pressure fluid and the throttle valve responsive pressure fluid exert opposing forces upon the differential pressure operated valve to effect reciprocation thereof, and a resilient means arranged to continuously exert a force on the differential pressure operated valve that opposes the force of the speed responsive pressure fluid, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in a first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, and a bypass conduit connecting said third conduit to said vent port whereby throttle valve responsive pressure fluid may be transmitted from a point in said third conduit on the downstream side of said first restriction orifice to a point in said vent port upstream from said second restriction orifice, said bypass conduit including a third restriction orifice and a flow control valve.

5. In an hydraulically operated control system as set forth in claim 4 wherein the first and second restriction orifices are of substantially identical size and shape and the third restriction orifice is of a considerably larger size than said first and second restriction orifices so as to provide less resistance to flow than said first and second restriction orifices.

6. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit comprising a reciprocable valve connected to said first conduit means so as to control the supply of line pressure fluid to the said control mechanisms, a source of pressure fluid having a pressure responsive to the speed of the motor vehicle, a second conduit means connecting said source of vehicle speed responsive pressure fluid to a first portion of said differential pressure operated valve, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second portion of the differential pressure operated valve in a manner whereby the vehicle speed responsive pressure fluid and the throttle valve responsive pressure fluid exert opposing forces upon the differential pressure operated valve to effect reciprocation thereof, and a resilient means arranged to continuously exert a force on the differential pressure operated valve that opposes the force of the speed responsive pressure fluid, said differential pressure operated valve being movable by said vehicle speed responsive pressure fluid to a first limiting position wherein the application of the throttle valve responsive fluid to said valve is prevented, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, and a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions.

7. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit comprising a reciprocable valve connected to said first conduit means so as to control the supply of line pressure fluid to the said control mechanisms, a source of pressure fluid having a pressure responsive to the speed of the motor vehicle, a second conduit means connecting said source of vehicle speed responsive pressure fluid to a first portion of said differential pressure operated valve, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second portion of the differential pressure operated valve in a manner whereby the vehicle speed responsive pressure fluid and the throttle valve responsive pressure fluid exert opposing forces upon the differential pressure operated valve to effect reciprocation thereof, a resilient means arranged to continuously exert a force on the differential pressure operated valve that opposes the force of the speed responsive pressure fluid, said differential pressure operated valve being movable by said vehicle speed responsive pressure fluid to a first limiting position wherein the application of the throttle valve responsive fluid to said valve is prevented, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, and a bypass conduit connecting said third conduit to said vent port whereby throttle valve responsive pressure fluid may be transmitted from a point in said third conduit on the downstream side of said first restriction orifice to a point in said vent port upstream from said second restriction orifice, said bypass conduit including a third restriction orifice and a flow control valve.

8. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship and a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position wherein the differential pressure operated valve actuates means that closes off the supply of throttle valve responsive pressure fluid to said second portion of the differential operated valve whereupon the throttle valve responsive pressure fluid generated force applied to the valve is zero.

9. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, and a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions.

10. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, and a by-pass conduit connecting said third conduit to said vent port whereby throttle valve responsive pressure fluid may be transmitted from a point in said third conduit on the downstream side of said first restriction orifice to a point in said vent port upstream from said second restriction orifice, said by-pass conduit including a third restriction orifice and a flow control valve.

11. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, and a by-pass conduit connecting said third conduit to said vent port whereby throttle valve responsive pressure fluid may be transmitted from a point in said third conduit on the downstream side of said first restriction orifice to a point in said vent port upstream from said second restriction orifice, said by-pass conduit including a third restriction orifice and a flow control valve, said differential pressure operated valve having conduit means associated therewith permitting the transfer of pressurized fluid from said by-pass conduit to the said second portion of the differential pressure operated valve.

12. A hydraulically operated control system as set forth in claim 11 including means operable by a predetermined opening movement of the throttle valve to control flow through the flow control valve of said by-pass conduit.

13. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, and a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, said differential pressure operated valve having a pressure fluid transfer conduit arranged to transfer throttle valve responsive pressure fluid from the said second portion of the differential pressure operated valve to the vent port when said differential pressure operated valve is moving between its said two limiting positions.

14. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, and a fourth conduit means connected betweeen said source of constant pressure fluid and a portion of said differential pressure operated valve whereby the constant pressure fluid may be applied to the differential pressure operated valve in a manner to provide a force that opposes the force of the output shaft speed responsive pressure fluid that is applied to the differential pressure operated valve, said fourth conduit having a flow control valve associated therewith to provide for selective application of the constant pressure fluid to the differential pressure operated valve.

15. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shaft of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, said differential pressure operated valve having a pressure fluid transfer conduit arranged to transfer throttle valve responsive pressure fluid from the said second portion of the differential pressure operated valve to the vent port when said differential pressure operated valve is moving between its said two limiting positions, and a fourth conduit means connected between said source of constant pressure fluid and a portion of said differential pressure operated valve whereby the constant pressure fluid may be applied to the differential pressure operated valve in a manner to provide a force that opposes the force of the output shaft speed responsive pressure fluid that is applied to the differential pressure operated valve, said fourth conduit having a flow control valve associated therewith to provide for selective application of the constant pressure fluid to the differential pressure operated valve.

16. In an hydraulically operated control system for an engine driven power transmission unit having input and output shafts, a pair of pressure fluid operated control mechanisms arranged for alternate activation to provide means for selectively transmitting a pair of different speed ratio drives from the input to the output shafts of said transmission unit, a source of constant pressure fluid, a first conduit means connecting said source of constant pressure fluid to each of said control mechanisms, an automatically controlled, differential pressure operated, valve unit comprising a reciprocable, plunger-type valve connected to said first conduit means to control the supply of the constant pressure fluid to said control mechanisms, a source of pressure fluid having a pressure responsive to the speed of the output shaft, a second conduit means connecting said source of output shaft speed responsive pressure fluid to a first portion of said differential pressure operated valve, a throttle valve for controlling the speed of the engine, a source of pressure fluid controlled by the movement of said throttle valve providing a source of pressure fluid having a pressure responsive to the valve opening movement of the throttle valve, a third conduit means connecting the source of throttle valve responsive pressure fluid to a second portion of the differential pressure operated valve whereby the output shaft speed responsive pressure fluid and the throttle valve responsive pressure fluid exert forces upon the differential pressure operated valve tending to reciprocate same that are arranged in opposed relationship, a resilient means acting on said valve so as to continuously exert a force thereon that opposes the force applied to the valve by the output shaft speed responsive pressure fluid, the resultant of the several forces applied to the valve being operable to actuate said valve and control the passage of the constant pressure fluid to said control mechanisms, said valve being arranged such that when the output shaft speed responsive pressure fluid generated force applied to the valve overcomes the forces opposed thereto and moves the valve to a first limiting position that the throttle valve responsive pressure fluid generated force applied to the valve is zero, a first restriction orifice in said third conduit, a vent port in the valve bore of said differential pressure operated valve for removing the throttle valve responsive pressure fluid that is applied to said second portion of said differential pressure operated valve, said vent port being located such that it is uncovered when said differential pressure operated valve is in said first limiting position and covered when said differential pressure operated valve is in a second limiting position, a second restriction orifice connected to the discharge side of said vent port whereby a pair of series arranged restriction orifices are provided to control the pressure of the throttle valve responsive pressure fluid applied to the second portion of the differential pressure operated valve during reciprocation of the differential pressure operated valve between its said two limiting positions, said differential pressure operated valve having a pressure fluid transfer conduit arranged to transfer throttle valve responsive pressure fluid from the said second portion of the differential pressure operated valve to the vent port when said differential pressure operated valve is moving between its said two limiting positions, a fourth conduit means connected between said source of constant pressure fluid and a portion of said differential pressure operated valve whereby the constant pressure fluid may be applied to the differential pressure operated valve in a manner to provide a force that opposes the force of the output shaft speed responsive pressure fluid that is applied to the differential pressure operated valve, said fourth conduit having a flow control valve associated therewith to provide for selective application of the constant pressure fluid to the differential pressure operated valve, and a by-pass conduit connecting said third conduit to said vent port whereby throttle valve responsive pressure fluid may be transmitted from a point in said third conduit on the downstream side of said first restriction orifice to a point in said vent port upstream from said second restriction orifice, said by-pass conduit including a third restriction orifice and a flow control valve.

17. In a hydraulically operated control system as set forth in claim 16 wherein said fourth conduit is connected to said first conduit through a one-way valve that provides for application of said constant pressure fluid to the said second portion of the differential pressure operated valve.

18. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising an output shaft driven source of constant pressure fluid, a differential pressure operated valve unit comprising a valve bore with a plunger-type, multiple land, valve reciprocably mounted therein, a first conduit means connecting said source of constant pressure fluid and to said control mechanisms and to said differential pressure operated valve so as to permit said differential pressure operated valve to conjointly control said pressure fluid operated control mechanisms, a source of pressure fluid responsive to the speed of said output shaft connected by conduit means to one end portion of the valve bore for said differential pressure operated valve, a source of pressure fluid responsive to the degree of opening of the engine throttle valve connected by conduit means to a second end portion of the bore for said differential pressure operated valve, said throttle valve responsive pressure being arranged to provide a force acting on said valve that is in opposed relation to the force acting on said valve due to the output shaft speed responsive pressure fluid applied thereto, a resilient means engaged with said valve so as to constantly exert a force on said valve that opposes the force applied thereto by the output shaft speed responsive pressure fluid, a vent port for said valve bore located intermediate the ends thereof and arranged to be uncovered by said valve when said valve is at one limit of its reciprocable movement within the valve bore and covered by said valve when the valve is at the other limit of its reciprocable movement within said bore, and a conduit means piercing said valve adapted to connect said second end portion of said bore to said vent port when the valve is intermediate its two limiting positions.

19. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising an output shaft driven source of constant pressure fluid, a differential pressure operated valve unit comprising a valve bore with a plunger-type, multiple land, valve reciprocably mounted therein, a first conduit means connecting said source of constant pressure fluid and to said control mechanisms and to said differential pressure operated valve so as to permit said differential pressure operated valve to conjointly control said pressure fluid operated control mechanisms, a source of pressure fluid responsive to the speed of said output shaft connected by conduit means to one end portion of the valve bore for said differential pressure operated valve, a source of pressure fluid responsive to the degree of opening of the engine throttle valve connected by conduit means to a second end portion of the bore for said differential pressure operated valve, said throttle valve responsive pressure being arranged to provide a force acting on said valve that is in opposed relation to the force acting on said valve due to the output shaft speed responsive pressure fluid applied thereto, a resilient means engaged with said valve so as to constantly exert a force on said valve that opposes the force applied thereto by the output shaft speed responsive pressure fluid, a vent port for said valve bore located intermediate the ends thereof and arranged to be uncovered by said valve when said valve is at one limit of its reciprocable movement within the valve bore and covered by said valve when the valve is at the other limit of its reciprocable movement within said bore, and a conduit means piercing said valve adapted to connect said second end portion of said bore to said vent port when the valve is intermediate its two limiting positions, a first restriction orifice in the conduit means applying said throttle valve responsive pressure fluid to said one end of the differential pressure operated valve, and a second restriction orifice in the discharge from said vent port, said first and second restriction orifices being arranged in series and connected by conduit means when said valve is intermediate its two limiting positions.

20. In a power transmission unit adapted to be driven by a throttle valve controlled engine and comprising an input shaft, an output shaft, gearing connectible between said shafts to provide for transmission of an underdrive therebetween, a clutch connectible between said shafts to provide for the transmission of a direct drive therebetween, a first pressure fluid operated mechanism to control said gearing and a second pressure fluid operated mechanism to control said clutch; a pressure fluid operated control system comprising an output shaft driven source of constant pressure fluid, a differential pressure operated valve unit comprising a valve bore with a plunger-type, multiple land, valve reciprocably mounted therein, a first conduit means connecting said source of constant pressure fluid and to said control mechanisms and to said differential pressure operated valve so as to permit said differential pressure operated valve to conjointly control said pressure fluid operated control mechanisms, a source of pressure fluid responsive to the speed of said output shaft connected by conduit means to one end portion of the valve bore for said differential pressure operated valve, a source of pressure fluid responsive to the degree of opening of the engine throttle valve connected by conduit means to a second end portion of the bore for said differential pressure operated valve, said throttle valve responsive pressure being arranged to provide a force acting on said valve that is in opposed relation to the force acting on said valve due to the output shaft speed responsive pressure fluid applied thereto, a resilient means engaged with said valve so as to constantly exert a force on said valve that opposes the force applied thereto by the output shaft speed responsive pressure fluid, a vent port for said valve bore located intermediate the ends thereof and arranged to be uncovered by said valve when said valve is at one limit of its reciprocable movement within the valve bore and covered by said valve when the valve is at the other limit of its reciprocable movement within said bore, and a conduit means piercing said valve adapted to connect said second end portion of said bore to said vent port when the valve is intermediate its two limiting positions, a first restriction orifice in the conduit means applying said throttle valve responsive pressure fluid to said one end of the differential pressure operated valve, a second restriction orifice in the discharge from said vent port, said first and second restriction orifices being arranged in series and connected by conduit means when said valve is intermediate its two limiting positions, a by-pass conduit connected between the throttle valve responsive pressure fluid supply conduit and the bore vent port, a flow control valve for said by-pass conduit and a third restriction orifice in said by-pass conduit.

21. In a power transmission as set forth in claim 20 wherein the flow control valve for the by-pass conduit is operated by means actuated by movement of the throttle valve to a substantially wide open position.

22. In a power transmission as set forth in claim 19 wherein the first and second restriction orifices are of substantially the same size and shape.

23. In a power transmission as set forth in claim 20 wherein the first and second restriction orifices are of substantially the same size and shape and the third restriction orifice is of a relatively larger size.

24. In a hydraulic control system, a valve body having a stepped, cylindrical valve bore of substantially T-shaped cross sectional configuration including a valve stem receiving portion and a valve head receiving portion, a multi-landed, cylindrical valve of T-shaped cross sectional configuration slidably mounted in said valve bore for axial reciprocation therein between limiting positions at opposite ends of the bore, said valve including connected head and stem portions, an axially directed bore piercing a portion of the stem of the T-shaped valve and extending from the free end of the stem towards the head end thereof, a transversely extending cross bore piercing the stem of the valve intermediate the ends thereof and connecting with the axially directed bore, a first pressure fluid inlet to the stem portion of the valve bore adjacent the free end of the valve stem arranged to apply a first pressure fluid to the exposed end of the valve stem, a first restriction orifice in said first pressure fluid inlet, a first source of pressure fluid connected to said first pressure fluid inlet, a second pressure fluid inlet to the valve bore adjacent the head end of the valve arranged to apply a second pressure fluid to the exposed end of the valve head, a second source of pressure fluid connected to said second pressure fluid inlet, the pressure fluid inlets to said valve bore from said first and second sources of pressure fluids being arranged to apply pressure fluids to the valve so as to exert opposed, axially directed, forces on said valve tending to cause axial movement thereof, a discharge conduit connected to the valve stem receiving portion of the valve bore intermediate the ends thereof having a pressure fluid vent connected thereto, a second restriction orifice in the discharge conduit between the valve bore and said vent, said first and second restrictions and said vent being arranged to be connected in series by said axially directed bore in said valve when said valve is moved between its limiting positions whereby the vent acts to suddenly vary the shifting forces applied to the valve by the pressure fluid from said first source so as to effect snap action shift of the valve between its limiting positions, an inlet port to and an outlet port from the valve stem receiving portion of said valve bore, said inlet port and outlet port being located in the valve stem receiving portion of the valve bore such that axial shift of the valve between its limiting positions alternately connects and disconnects said ports, a source of pressure fluid connected to said inlet port and adapted to be connected through said valve bore to said outlet port when said valve is forced to its limiting position at one end of the valve bore and to be disconnected from said outlet port when said valve is forced to its limiting position at the other end of the valve bore, and a land on said valve stem intermediate the ends thereof arranged to close off the discharge conduit from the valve stem bore when said valve is at its limiting position at the said other end of the valve bore to prevent series connection of said first and second restrictions and said vent, said land being arranged to close said first pressure fluid inlet when the valve is at its limiting position at the said one end of the valve bore.

25. In a hydraulic control system as set forth in claim 24 including a by-pass conduit connecting said first pressure fluid inlet to the discharge conduit between the valve bore and the second restriction, a flow control valve in said by-pass conduit and a third restriction orifice in said by-pass conduit.

26. In a hydraulic control system as set forth in claim 24 wherein the valve bore receiving the valve head portion is provided with a second inlet port arranged on the stem side of the valve head and adapted to be selectively connected to a source of pressure fluid whereby an axially directed force can be applied to the valve to oppose the force applied to the head end of the valve by the second source of pressure fluid.

27. In a hydraulic control system, a valve body having a stepped, cylindrical valve bore of substantially T-shaped cross sectional configuration including a valve stem receiving portion and a valve head receiving portion, a stepped, cylindrical valve of T-shaped cross sectional configuration slidably mounted in said valve bore for axial reciprocation therein between limiting positions at opposite ends of the bore, said valve including connected head and stem portions, a conduit connected to said valve bore and extending lengthwise thereof, said conduit extending from adjacent the free end of the valve stem portion towards the head end portion thereof, a transversely extending cross bore intermediate the ends of the valve bore stem portion and connecting with said conduit, a first pressure fluid inlet to the stem portion of the valve bore adjacent the free end of the valve stem, a first restriction orifice in said first pressure fluid inlet, a first source of pressure fluid connected to said first pressure fluid inlet, a second pressure fluid inlet to the valve bore adjacent the head end of the valve, a second source of pressure fluid connected to said second pressure fluid inlet, the pressure fluid inlets to said valve bore from said first and second sources of pressure fluids being arranged to apply pressure fluid to the valve to exert opposed axially directed forces on said valve tending to cause axial movement thereof, a discharge conduit connected to the valve stem receiving portion of the valve bore intermediate the ends thereof having a pressure fluid vent connected thereto, a second restriction orifice in the discharge conduit between the valve bore and said vent, said first and second restrictions and said vent being arranged to be connected in series by said axially directed bore in said valve when said valve is moved between its limiting positions whereby the vent acts to suddenly vary the shifting forces applied to the valve by the pressure fluid from said first source so as to effect snap action shift of the valve between its limiting positions, an inlet port to and an outlet port from the valve stem receiving portion of said valve bore, said inlet port and outlet port being located in the valve stem receiving portion of the valve bore such that axial shift of the valve between its limiting positions alternately connects and disconnects said ports, a source of pressure fluid connected to said inlet port and adapted to be connected through said valve bore to said outlet port when said valve is forced to its limiting position at one end of the valve bore and to be disconnected from said outlet port when said valve is forced to its limiting position at the other end of the valve bore, and a land on said valve stem intermediate the ends thereof arranged to close off the discharge conduit from the valve stem bore when said valve is at its limiting position at the said other end of the valve bore to prevent series connection of said first and second restrictions and said vent, said land being arranged to close said first pressure fluid inlet when the valve is at its limiting position at the said one end of the valve bore.

28. In a hydraulic control valve unit comprising a valve bore with a valve unit mounted therein for axial reciprocation, a first pressure fluid inlet to said bore at one end, a second pressure fluid inlet to said bore at the other end, said pressure fluid inlets being arranged to apply opposed, axially directed, forces to said valve to effect reciprocation thereof, a resilient means continuously acting on said valve to apply an axially directed force to said valve in one direction, a vent port connected by a conduit to said bore intermediate the ends thereof and arranged to be controlled by the axial movement of said valve in said bore, a pressure fluid conduit in said valve extending lengthwise thereof adapted to connect one of said pressure fluid inlets to said vent conduit during a portion of the axial movement of said valve, a first restriction orifice in said first pressure fluid inlet and a second restriction orifice in the discharge conduit connected to the vent port, said orifices being arranged in series with said vent when said first pressure fluid inlet and said vent port are connected by said valve conduit whereby said vent causes a sudden variation in the pressure fluid force applied to said valve at said one end of the valve bore to thereby cause a snap action shift of said valve towards an end of the valve bore.

29. In an hydraulically operated control system, a pair of pressure fluid operated control mechanisms arranged for selective activation, a source of substantially constant pressure fluid, a first conduit means connecting said source of constant pressure fluid to each of said control mechanisms, a differential pressure operated, valve unit comprising a reciprocable valve connected to said first conduit means so as to control the supply of said substantially constant pressure fluid to the said control mechanisms, a first source of variable pressure fluid, a second conduit means connecting said first source of variable pressure fluid to a first portion of said differential pressure operated valve, an operator operable control valve movable between open and closed positions, a second source of variable pressure fluid controlled by the movement of said operator operable control valve, a third conduit means connecting the second source of variable pressure fluid to a second portion of the differential pressure operated valve in a manner whereby the first and second sources of variable pressure fluid exert opposing forces upon the differential pressure operated valve to effect reciprocation thereof, and a resilient means arranged to continuously exert a force on the differential pressure operated valve that opposes the force exerted thereon by one of said variable pressure fluids, said differential pressure operated valve being movable by one of said variable pressure fluids to a first limiting position wherein the differential pressure operated valve includes means that closes off the supply of pressure fluid thereto from said second source and the application of the other variable pressure fluid to said differential pressure operated valve is prevented and the resilient means is the only force acting on said valve that opposes the force exerted on said valve by said one variable pressure fluid when said valve is in said first limiting position.

30. In a hydraulic control system as set forth in claim 24 wherein the first and second restriction orifices are of substantially the same size and shape and adapted to be arranged in series in a fluid flow conduit when said valve is located intermediate its said two limiting positions.

31. In a hydraulic control system as set forth in claim 24 including a by-pass conduit connecting said first pressure fluid inlet to the discharge conduit, a flow control valve in said by-pass conduit and a third restriction orifice in said by-pass conduit, said third restriction orifice being of relatively larger size than said first and second restriction orifices.

32. In a hydraulic control system of the type set forth in claim 24 wherein the valve bore adjacent the head portion thereof is provided with a second inlet port and a connected bore chamber adapted to be selectively connected to a source of pressure fluid whereby a force can be applied to the valve to oppose the force applied to the head end of the valve by the second source of pressure fluid, said source of pressure fluid connected to said last mentioned bore chamber being connected to the first pressure fluid inlet to the valve bore through a one-way valve whereby the pressure fluid applied to said last mentioned bore chamber can be applied to the free end of the stem portion of said valve.

33. In a hydraulic control system, a valve unit comprising a valve body having a valve bore of substantial length, a valve slidably mounted in said valve bore for axial reciprocation therein between a pair of limiting positions, a passage extending lengthwise of a portion of the valve body and connected to said valve bore adjacent one end theerof, a transversely extending cross bore piercing the valve intermediate the ends thereof and arranged to be connected to the said passage during a portion of valve movement, a first pressure fluid inlet to the valve bore adjacent one end of the valve, a first restriction orifice in said first pressure fluid inlet, a source of pressure fluid connected to said first pressure fluid inlet, a second pressure fluid inlet to the valve bore adjacent the other end of the valve, a source of pressure fluid connected to said second pressure fluid inlet, the pressure fluid inlets to said valve bore from said sources of pressure fluids being arranged to apply pressure fluid to the valve so as to exert opposed axially directed, forces on said valve with the resultant thereof tending to cause axial movement of the valve, a discharge conduit connected to the valve bore intermediate the ends thereof and having a vent port therein, a second restriction orifice in the discharge conduit between the valve bore and the vent port, an inlet port to and an outlet port from the valve bore adapted to be connected and disconnected by axial shift of said valve in said bore, a source of pressure fluid connected to said inlet port and adapted to be connected to said outlet port when said valve is moved to a limiting position at one end of the valve bore and to be disconnected from said outlet port when said valve is moved towards a limiting position at the other end of the valve bore, said restriction orifices being connected in series with said vent during certain shifting movements of said valve to materially vary the pressure fluid forces acting on one portion of the valve whereby the resultant force applied to the valve will provide a snap action force for moving said valve to one of its limiting positions.

34. In a hydraulic control system, a valve body having an elongated valve bore, a valve slidably mounted in said valve bore for axial reciprocation therein between a pair of limiting positions, said valve including an axially directed bore that extends lengthwise thereof, a transversely extending cross bore piercing the valve intermediate the ends thereof and connecting with the axially directed bore, a first pressure fluid inlet to a portion of the valve bore adjacent one end thereof, a first restriction orifice in said first pressure fluid inlet, a second pressure fluid inlet to the valve bore adjacent the other end thereof, the pressure fluid inlets to said valve bore being arranged to apply pressure fluid to the valve so as to exert opposed axially directed, forces on said valve tending to cause axial movement thereof in said bore, a discharge conduit connected to the valve bore intermediate the ends thereof adapted to be connected to said valve cross bore during a portion of axial shift of said valve from one of its limiting positions to the other, a vent in said discharge conduit, a second restriction orifice in the discharge conduit between the valve bore and the vent, an inlet port to and an outlet port from the valve bore, said inlet port and outlet port being located in the bore intermediate the ends thereof and adapted to be connected and disconnected by axial movement of the valve in said valve bore between its pair of limiting positions, said restriction orifices being connected together in series with said vent and disconnected from one another by axial shift of the valve in the valve bore to materially vary the effect of the pressure fluid shifting forces applied to a portion of said valve whereby the resultant force acting on said valve during a portion of its axial movement is suddenly changed to produce snap action shifting forces for said valve.

35. A snap action control valve unit comprising a valve body with an elongated bore therein, a valve shiftable longitudinally in said bore between a pair of limiting positions, a fluid flow conduit extending across said bore and adapted to be opened and closed by the shift of the valve in said bore between said pair of limiting positions, a first pressure fluid inlet to a first portion of said bore arranged such that it is closed off when said valve is in one of its limiting positions, a first restriction orifice in said first inlet, a second pressure fluid inlet to a second portion of said bore, said first and second pressure fluid inlets being arranged such that pressure fluid therefrom simultaneously admitted to said bore exerts opposed longitudinally directed forces on said valve tending to effect shift of said valve in said bore, a discharge conduit connected to said bore intermediate the limiting positions thereof, a vent in said discharge conduit, a second restriction orifice in said discharge conduit between said bore and said vent, a passage controlled by shift of said valve longitudinally of said bore arranged to connect the pressure applied to said valve from said first pressure fluid inlet to said discharge conduit when said valve is moved away from one of its limiting positions towards the other limiting position, said first and second restriction orifices and said vent being connected in series through said passage when said valve is shifting between said limiting positions whereby a sudden variation and material in the pressure fluid forces applied to said valve by pressure fluid from said first inlet occurs and effects a snap action shift of said valve to one of its limiting positions.

36. A snap control valve unit as set forth in claim 35 including a by-pass conduit connecting a portion of the first pressure fluid inlet on the upstream side of said first restriction orifice to a portion of said discharge conduit on the upstream side of said second restriction orifice, said by-pass conduit including a flow control valve.

37. A snap action control valve unit as set forth in claim 36 wherein said by-pass conduit includes a restriction orifice.

38. A snap action control valve unit as set forth in claim 35 including a third pressure fluid inlet to said bore arranged to apply pressure fluid to said valve to provide means for anchoring said valve in one of its limiting positions irrespective of variation in pressures of the fluid applied to said valve from said first and second pressure fluid inlets.

References Cited in the file of this patent

UNITED STATES PATENTS

| | | |
|---|---|---|
| 2,020,773 | Ernst | Nov. 17, 1935 |
| 2,034,272 | Schroeder | Mar. 17, 1936 |
| 2,131,075 | Sanford | Sept. 27, 1938 |
| 2,157,707 | Keel | May 9, 1939 |
| 2,204,872 | Thompson | June 18, 1940 |
| 2,299,079 | Davis | Oct. 20, 1942 |
| 2,329,724 | Maurer | Sept. 21, 1943 |
| 2,516,203 | Greenlee | July 25, 1950 |
| 2,516,208 | Hasbany | July 25, 1950 |
| 2,566,519 | Farkas | Sept. 4, 1951 |
| 2,577,413 | Frailing | Dec. 4, 1951 |
| 2,592,773 | Weiss | Apr. 15, 1952 |
| 2,599,215 | Wemp | June 3, 1952 |
| 2,603,235 | Kirkham | July 15, 1952 |
| 2,606,460 | Kelley | Aug. 12, 1952 |
| 2,625,136 | Moog | Jan. 13, 1953 |
| 2,640,373 | Jandasek | June 2, 1953 |

FOREIGN PATENTS

| | | |
|---|---|---|
| 24,973 | Norway | Aug. 31, 1914 |
| 454,219 | Canada | Jan. 18, 1949 |
| 663,704 | Great Britain | Dec. 27, 1951 |
| 966,238 | France | Oct. 4, 1950 |